(12) United States Patent
Wang et al.

(10) Patent No.: US 10,739,863 B2
(45) Date of Patent: Aug. 11, 2020

(54) METHOD FOR RESPONDING TO GESTURE ACTING ON TOUCHSCREEN AND TERMINAL

(71) Applicant: Huawei Technologies Co., Ltd., Shenzhen (CN)

(72) Inventors: Hongjun Wang, Shenzhen (CN); Yingfeng Hu, Shenzhen (CN); Jie Xu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 91 days.

(21) Appl. No.: 16/067,050

(22) PCT Filed: Dec. 31, 2015

(86) PCT No.: PCT/CN2015/100280
§ 371 (c)(1),
(2) Date: Jun. 28, 2018

(87) PCT Pub. No.: WO2017/113365
PCT Pub. Date: Jul. 6, 2017

(65) Prior Publication Data
US 2019/0025933 A1 Jan. 24, 2019

(51) Int. Cl.
*G06F 3/01* (2006.01)
*G06F 3/0484* (2013.01)
(Continued)

(52) U.S. Cl.
CPC ............ *G06F 3/017* (2013.01); *G06F 1/1626* (2013.01); *G06F 1/1643* (2013.01); *G06F 3/044* (2013.01);
(Continued)

(58) Field of Classification Search
CPC ...... G06F 3/017; G06F 3/0484; G06F 3/0488; G06F 1/1643; G06F 3/0414; G06F 3/044; G06F 1/1626
(Continued)

(56) References Cited

U.S. PATENT DOCUMENTS

| 8,935,627 B2* | 1/2015 | Ryu | ...................... G06F 3/0483 715/776 |
| 2009/0046110 A1* | 2/2009 | Sadler | ..................... G06F 3/048 345/660 |

(Continued)

FOREIGN PATENT DOCUMENTS

| AU | 2015101188 A4 | 10/2015 |
| CN | 103118166 A | 5/2013 |

(Continued)

*Primary Examiner* — Calvin C Ma
(74) *Attorney, Agent, or Firm* — Slater Matsil, LLP

(57) ABSTRACT

A mobile terminal detects a gesture on a touchscreen; when a pressure value of the gesture exceeds a first threshold P1, starts to record change information of the pressure value of the gesture; when the pressure value is lower than a second threshold P2, stops to record the change information of the pressure value; parses the recorded change information of the pressure value; when the parsing of the change information indicates that the gesture includes at least two consecutive effective screen presses, determines that the gesture matches a first instruction; and in response to the first instruction, presents a first graphical user interface on the touchscreen. In this manner, press gesture identifying precision can be improved, and a problem that it is difficult for the touchscreen to distinguish a long press from the press gesture can be avoided.

22 Claims, 15 Drawing Sheets

(51) Int. Cl.
*G06F 3/041* (2006.01)
*G06F 3/044* (2006.01)
*G06F 3/0488* (2013.01)
*G06F 1/16* (2006.01)

(52) U.S. Cl.
CPC .......... *G06F 3/0414* (2013.01); *G06F 3/0484* (2013.01); *G06F 3/0488* (2013.01); *G06F 3/04883* (2013.01)

(58) Field of Classification Search
USPC ................................................. 345/173, 174
See application file for complete search history.

(56) References Cited

U.S. PATENT DOCUMENTS

| | | |
|---|---|---|
| 2012/0105367 A1 | 5/2012 | Son et al. |
| 2014/0009441 A1 | 1/2014 | Bernstein et al. |
| 2015/0058723 A1* | 2/2015 | Cieplinski ........... G06F 3/04855 715/702 |
| 2015/0062079 A1 | 3/2015 | Shih et al. |
| 2016/0274686 A1* | 9/2016 | Alonso Ruiz ....... G06F 3/04842 |
| 2018/0081493 A1 | 3/2018 | Wang et al. |

FOREIGN PATENT DOCUMENTS

| | | |
|---|---|---|
| CN | 103513882 A | 1/2014 |
| CN | 104007847 A | 8/2014 |
| CN | 104049759 A | 9/2014 |
| CN | 104063164 B | 9/2014 |
| CN | 104820566 A | 8/2015 |
| CN | 105045454 A | 11/2015 |
| WO | 2014018732 A2 | 1/2014 |
| WO | 2014146443 A1 | 9/2014 |

\* cited by examiner

Press a screen

In a case in which a finger touches the screen, release the pressure to a general touch pressure range, which is identified as a light press Generate a light press password

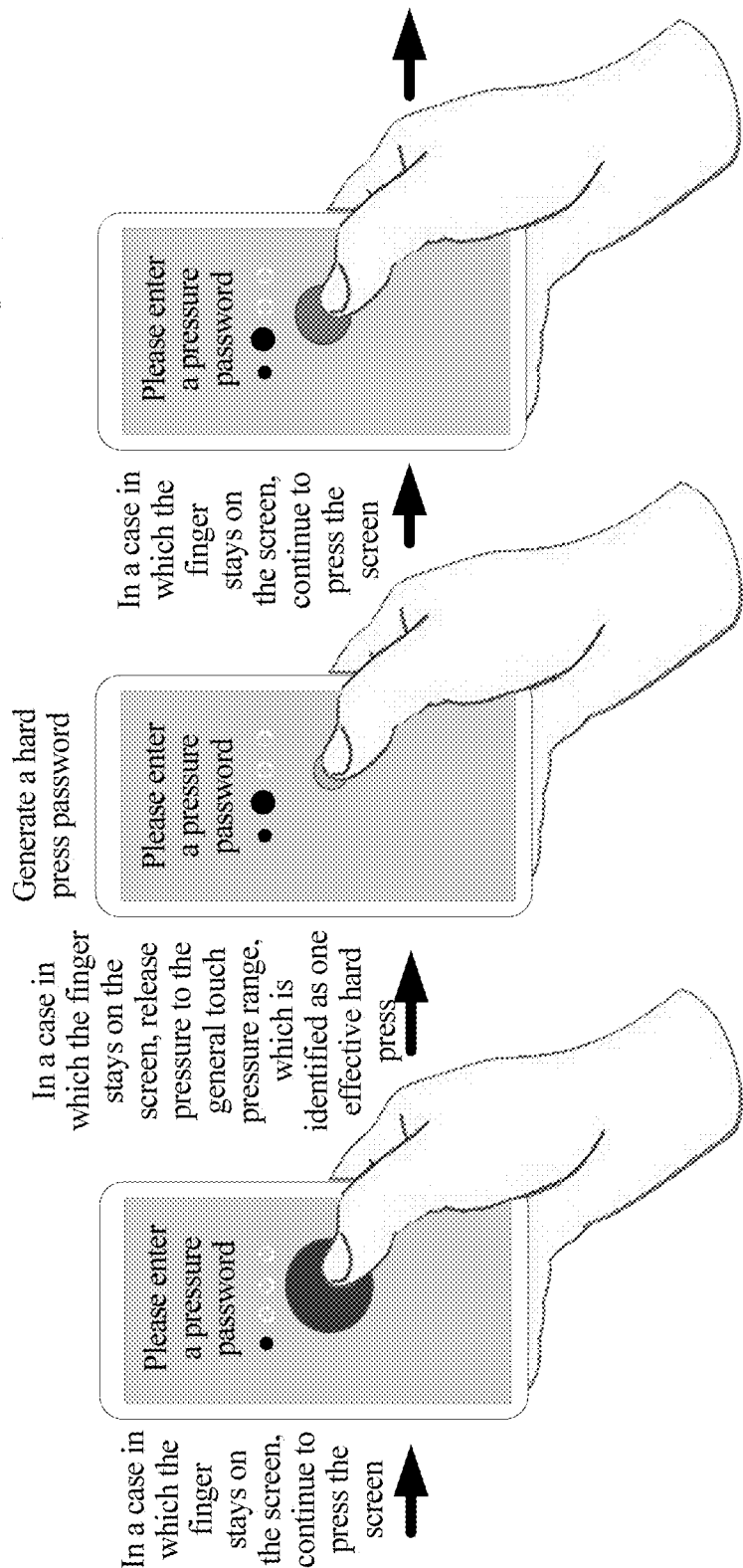

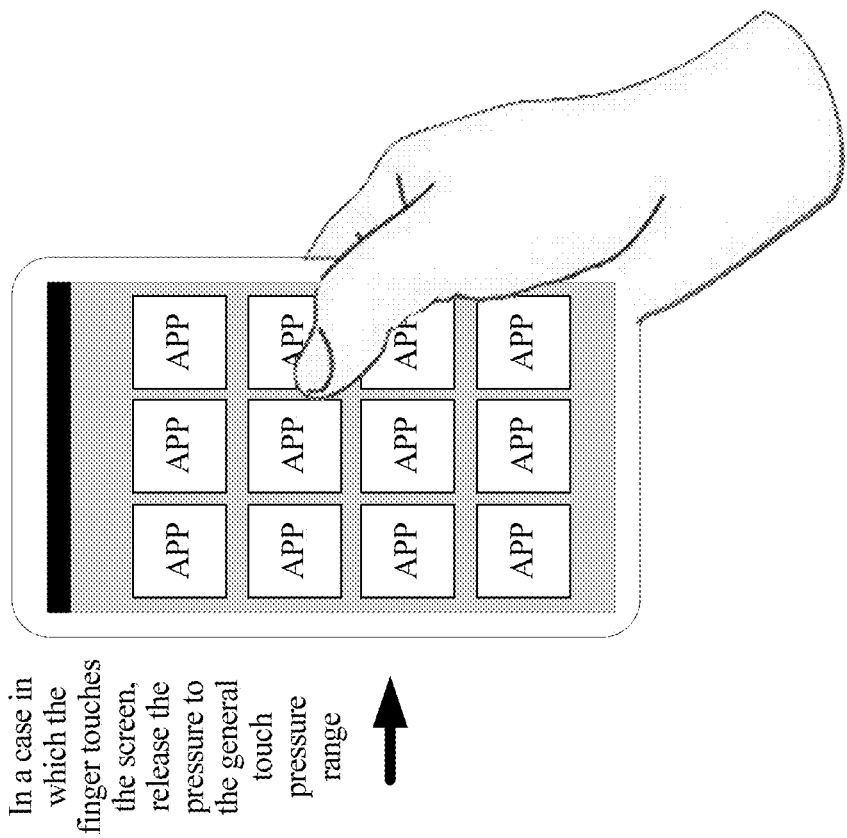

METHOD FOR RESPONDING TO GESTURE ACTING ON TOUCHSCREEN AND TERMINAL

TECHNICAL FIELD

The present invention relates to the field of mobile communications, and in particular, to a method for responding to a gesture acting on a touchscreen and a terminal.

BACKGROUND

As a mobile terminal such as a mobile phone and a tablet computer is more widely used, a user gets used to directly triggering various gestures on a touchscreen by using a finger. Because the touchscreen is easy to use, has good user experience, and the like, there are rich and various gesture forms, for example, a long press, a tap, a drag, a slide, and the like.

When the user triggers a press gesture on the touchscreen, it is relatively easy to cause a misoperation. For example, when the user presses the touchscreen and expects to trigger a press gesture, if the mobile terminal cannot correctly distinguish whether the user gesture is a press gesture or a long press gesture, the mobile terminal may incorrectly identify the user press gesture as a long press gesture, and in response to the identified long press gesture, present a graphical user interface corresponding to the long press gesture on the touchscreen of the terminal. The misoperation may cause poor user experience, and needs to be improved.

SUMMARY

Embodiments of the present invention provide a method for responding to a gesture acting on a touchscreen and a terminal, so as to improve accurate identification of a user press gesture by a mobile terminal.

According to one aspect, an embodiment of this application provides a method for responding to a gesture acting on a touchscreen. The method includes the following: A mobile terminal detects a gesture acting on a touchscreen by a user; when a pressure value of the gesture exceeds a first threshold P1, starts to record change information of the pressure value of the gesture; and when the pressure value of the gesture is lower than a second threshold P2, stops recording the change information of the pressure value. The pressure value is a digital parameter of pressure or an analog parameter of pressure. The recorded change information of the pressure value is parsed. When the parsing of the change information indicates that the gesture includes at least two consecutive effective screen presses, it is determined that the gesture matches a first instruction. In response to the first instruction, a first graphical user interface is presented on the touchscreen.

In this manner, when there is a gesture that includes at least two consecutive effective screen presses, the gesture is responded. This can improve precision of identifying a press gesture by the touchscreen using press sensing, resolve a problem that it is difficult for the touchscreen to distinguish a long press from the press gesture, and improve user experience.

In a possible design, if the change information of the pressure value indicates the following first event occurs, the gesture is considered to include one effective screen press. The first event is as follows: The pressure value of the gesture is reduced from being greater than a third threshold P3 to being less than a fourth threshold P4 once, where $P3>P4 \geq P1 \geq P2$. A high threshold and a low threshold are set, so that the press gesture can be prevented from generating an invalid operation, and precision of identifying press touch by the touchscreen is improved.

In a possible design, if the change information of the pressure value indicates that a second event occurs, the gesture is considered to include one effective screen press, and this effective screen press is a hard press. The second event is as follows: The pressure value of the gesture is reduced from being greater than a fifth threshold P5 to being less than the fourth threshold P4 once, where $P5>P3>P4 \geq P1 \geq P2$.

In a possible design, if the change information of the pressure value indicates that a third event occurs, the gesture is considered to include one effective screen press, and this effective screen press is a light press. The third event is as follows: The pressure value of the gesture is reduced from being greater than a sixth threshold P6 to being less than the fourth threshold P4 once, and the pressure value of the gesture is less than the fifth threshold P5, where $P5>P6 \geq P3>P4 \geq P1 \geq P2$.

The mobile terminal can define multiple types of gesture instructions by defining multiple types of press gestures such as a light press and a hard press. The multiple types of press gestures may further be combined with another type of gesture. Combinations of the multiple types of press gestures and multiple gestures can enrich a means by which the user interacts with the mobile terminal, for example, the means is used to set a screen password unlocking gesture of the touchscreen. This can increase diversity of gestures entered on the mobile terminal.

In a possible design, the change information of the pressure value is recorded by collecting the pressure value of the gesture at a time interval. When the time interval is shorter, more data is collected, and the mobile terminal can more accurately identify at least two consecutive effective screen presses of the press gesture.

In a possible design, according to the time interval of collecting the pressure value of the gesture, the recorded pressure value is successively compared with the first threshold P1 to the sixth threshold P6, so as to parse the recorded change information of the pressure value. In this manner, a change process of the pressure value is efficiently recorded. Compared with a manner in which pressure values collected at every time interval are compared with each other, this manner efficiently reduces a bit error rate and an error ratio of collected data.

In a possible design, it is limited in the foregoing that, when the pressure value of the gesture exceeds the first threshold P1, the change information of the pressure value of the gesture starts to be recorded; and when the pressure value is lower than the second threshold P2, recording of the change information of the pressure value stops; and it is ensured that when the change information of the pressure value of the press gesture is being recorded, the user press gesture always acts on the touchscreen, and does not leave the screen.

In a possible design, after detecting the user gesture on the touchscreen, the mobile terminal verifies the user gesture on the touchscreen, records a maximum pressure value Pmax entered by the user and a minimum pressure value Pmin entered by the user, and according to the maximum pressure value Pmax and the minimum pressure value Pmin that are entered by the user and that are obtained through verification, sets a pressure deviation value ΔP that adapts to the user. For example, after a child enters a maximum pressure value Pcmax and a minimum pressure value Pcmin, it is determined that the maximum pressure value entered by the child is less than P2. In this case, a pressure deviation value ΔP that adapts to pressure input of the child is set. When it is determined whether the input of the child is an effective press, ΔPc is subtracted from thresholds of the first threshold P1 to the sixth threshold P6, and obtained difference values are compared with the detected pressure value of the gesture acting on the touchscreen. In this manner, personalized customization is performed for users with different press intensity. This avoids a problem that when the users with different press intensity for the touchscreen press the screen, the mobile terminal performs same determining and comparison, which causes a same result in response to the different press intensity; and improves user experience.

According to another aspect, an embodiment of this application provides a method for responding to a gesture. The method includes the following: A mobile terminal detects whether there is a gesture acting on a touchscreen; when detecting that there is a gesture acting on the touchscreen, starts to record change information of a pressure value of the gesture; when detecting that the gesture no longer acts on the touchscreen, stops recording the change information of the pressure value, where the pressure value is a digital parameter of pressure or an analog parameter of pressure; parses the recorded change information of the pressure value; when the parsing of the change information indicates that the gesture includes at least two consecutive effective screen presses, determines that the gesture matches a first instruction; and in response to the first instruction, presents a first graphical user interface on the touchscreen.

In this manner, the gesture that includes at least two consecutive effective screen presses matches the first instruction. This can improve precision of identifying a press gesture by the touchscreen using press sensing, resolve a problem that it is difficult for the touchscreen to distinguish a long press from the press gesture, and improve user experience.

In a possible design, in response to the first instruction, a suspend icon is displayed on the touchscreen or a home screen entered after unlocking is displayed on the touchscreen. By using at least two consecutive effective screen presses of a finger that stays on the screen, the suspend icon is displayed on the touchscreen or the screen entered after unlocking is displayed on the touchscreen. This resolves a problem of an inconvenient operation and poor user experience. For example, it is tedious to operate a settings menu and a program in a full-screen game mode. In a case of not exiting the full-screen game, a user can make the suspend icon displayed by using at least two consecutive effective screen presses of the finger that stays on the screen, so as to improve task process processing efficiency of a processor of the mobile terminal, properly use a memory resource, and further improve user experience.

In a possible design, if a time interval between two effective screen presses is greater than a first time interval T1 and less than a second time interval T2, the two screen presses are considered as two consecutive effective screen presses. Two effective screen presses are ensured to be consecutive presses by setting that a time interval between the two effective screen presses is greater than T1 and less than T2, so as to avoid that the mobile terminal still records a press touch of the touchscreen after the time interval is greater than the time interval T2. This avoids that the processor and the memory resource of the mobile terminal are continuously occupied by a program that is used to determine the press gesture, improves use efficiency of the processor and the memory resource of the mobile terminal, and improves identification and precision of the mobile terminal for the user press gesture.

According to another aspect, an embodiment of this application provides a method for responding to a gesture. The method includes detecting a gesture acting on a touchscreen; when a pressure value of the gesture exceeds a first threshold P1, starting to record change information of the pressure value of the gesture; when the pressure value is lower than a second threshold P2, stopping recording the change information of the pressure value; parsing the recorded change information of the pressure value; when the parsing of the change information indicates that the gesture includes at least two consecutive effective screen presses, obtaining a user touch gesture within a third time interval T3; according to the gesture that includes at least two consecutive effective screen presses and the touch gesture, determining that the gesture matches a second instruction; and in response to the second instruction, presenting a second graphical user interface on the touchscreen.

In a possible design, a screen split or a graphical user interface of screen switching is presented on the touchscreen.

In a possible design, the touch gesture includes a slide, a long press, or a tap.

The press gesture and a conventional gesture that are identified by the mobile terminal are combined, so as to define a graphical user interface that is responding to a new combination manner and that is on the mobile terminal, provide the mobile terminal with more response combinations, enrich a means by which the user interacts with the mobile terminal, and provide the user with diverse choices.

According to another aspect, an embodiment of this application provides a method for responding to a gesture. The method includes detecting whether there is a gesture on a touchscreen; when it is detected that there is a gesture acting on the touchscreen, starting to record change information of a pressure value of the gesture; when it is detected that the gesture no longer acts on the touchscreen, stopping recording the change information of the pressure value; parsing the recorded change information of the pressure value; when the parsing of the change information indicates that the gesture includes at least two consecutive effective screen presses, obtaining a touch gesture within a third time interval T3; according to the gesture that includes at least two consecutive effective screen presses and the touch gesture, determining that the gesture matches a second instruction; and in response to the second instruction, presenting a second graphical user interface on the touchscreen.

In a possible design, a screen split or a graphical user interface of screen switching is presented on the touchscreen.

In a possible design, the touch gesture includes a slide, a long press, or a tap.

A press gesture is combined with another user touch gesture, so as to define a graphical user interface that is responding to a new combination manner and that is on the mobile terminal, and enrich a means by which the user interacts with the mobile terminal. For example, two consecutive effective screen presses and a slide are combined, so as to display a menu screen split on the graphical user interface.

According to another aspect, an embodiment of this application provides a terminal, including: a touchscreen, one or more processors, a memory, multiple application programs, and one or more programs. The one or more programs are stored in the memory and executed by the one or more processors. The one or more programs include an instruction, and the instruction is used to: detect a gesture on the touchscreen; when a pressure value of the gesture exceeds a first threshold P1, start to record change information of the pressure value of the gesture; when the pressure value is lower than a second threshold P2, stop recording the change information of the pressure value; parse the recorded change information of the pressure value; when the parsing of the change information indicates that the gesture includes at least two consecutive effective screen presses, determine that the gesture matches a first instruction; and in response to the first instruction, present a first graphical user interface on the touchscreen.

A mobile terminal responds to different user gestures according to a gesture that the user presses the screen twice in succession. With this method, user gesture identifying efficiency of the touchscreen of the mobile terminal is improved, and diversity of the user gesture identified by the mobile terminal is increased.

According to another aspect, an embodiment of this application provides a terminal, including: a touchscreen, one or more processors, a memory, multiple application programs, and one or more programs. The one or more programs are stored in the memory and executed by the one or more processors. The one or more programs include an instruction, and the instruction is used to: detect whether there is a gesture on the touchscreen; when it is detected that there is a gesture acting on the touchscreen, start to record change information of a pressure value of the gesture; when it is detected that the gesture no longer acts on the touchscreen, stop recording the change information of the pressure value; parse the recorded change information of the pressure value; when the parsing of the change information indicates that the gesture includes at least two consecutive effective screen presses, determine that the gesture matches a first instruction: and in response to the first instruction, present a first graphical user interface on the touchscreen.

With this method, when detecting that there is a gesture on the touchscreen, and identifying at least two consecutive effective screen presses, the mobile terminal responds to the gesture, thereby improving precision of identifying a press gesture by the touchscreen using press sensing, and improving user experience.

It is learned from the foregoing technical solutions that the embodiments of the present invention have the following advantages:

When the user press gesture includes at least two consecutive effective screen presses, the gesture is responded, thereby improving precision of identifying the press gesture by the touchscreen using press sensing, resolving a problem that it is difficult for the touchscreen to distinguish a long press from the press gesture, and improving user experience.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

FIG. 6a to FIG. 6j are schematic diagrams of another graphical user interface presented by a mobile terminal in response to a user gesture;

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

In the present invention, a related mobile terminal is a mobile device such as a smartphone and a tablet computer. The mobile terminal in embodiments of the present invention has a touchscreen that implements a press touch by using press sensing.

Figure 1:
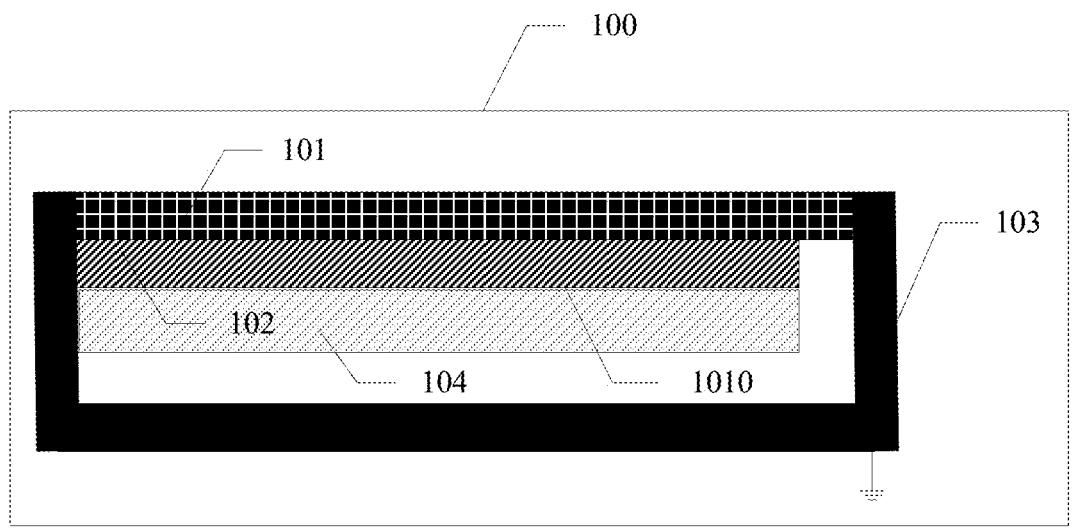
FIG. 1 is a schematic diagram of an internal structure of a touchscreen that implements a press touch.

FIG. 1 is a schematic diagram of an internal structure of a touchscreen that implements a press touch. As shown in FIG. 1, a touchscreen 100 of a mobile terminal includes: a cover 101, a display module 102, a metal middle frame 103, and a conducting layer 104. The display module 102 is located between the cover 101 and the metal middle frame 103. The metal middle frame 103 is grounded. The conducting layer 104 is laminated to a lower surface 1010 of the display module 102. As shown in FIG. 1, viewed in a vertical direction from a top layer of the terminal to a bottom layer of the terminal, an upper surface of the display module is laminated to the cover, and the conducting layer is laminated to the lower surface of the display module.

The foregoing terms are explained below:

The cover 101 is cover glass (Cover Glass), and the cover glass is also referred to as a touchscreen cover, configured to enclose or cover a component of the display module of the terminal. The cover is mainly made of a material of glass. A thickness specification of the cover is between 0.1 mm and 1.1 mm. Certainly, the cover may be made of another material. This is not limited herein.

The display module 102 is one of main components that constitute a finished product of a display screen, and mainly includes a backlight unit, a substrate, a drive circuit, a resistor, a capacitor, a plastic kit, and the like.

The metal middle frame 103 is a component configured to carry a device such as the display module, and is made of a material of metal, such as an aluminous middle frame.

As shown in FIG. 1, capacitance between the conducting layer 104 and the metal middle frame 103 forms at least one capacitor. The conducting layer 104 may be considered as a plate of the capacitor. The metal middle frame 103 may be considered as another plate of the capacitor. The capacitor may be used as a press-sensitive sensor. For example, a user generates a specific force when pressing the cover. An action of the force causes deformation of the conducting layer 104, so that a distance between the two plates of the capacitor changes, thereby changing the capacitance of the capacitor. Further, magnitude of pressure acted on the cover by the user is directly proportional to a capacitance change of the capacitor. For example, larger pressure acting on the cover causes a greater capacitance change of the capacitor. Therefore, a correspondence between a user touch gesture and a pressure change of the touchscreen is established. The mobile terminal determines, according to a received capacitance change signal of the capacitor, a change of the pressure acted on the cover of the touchscreen by the user, so as to respond to a corresponding operation. For example, when the pressure acted on the touchscreen of the mobile terminal by the user increases gradually, the mobile terminal responds to the operation of the user, and a volume of the mobile terminal also increases gradually; and when the pressure acted on the touchscreen of the mobile terminal by the user decreases gradually, the volume of the mobile terminal also decreases gradually.

The foregoing described structure that is of the touchscreen and that has a press sensing function is merely one example of a structure of the touchscreen on which the pressure change is detected. A method for responding to a gesture acting on a touchscreen discussed in this embodiment is implemented on the foregoing described touchscreen that has the press sensing function or the mobile terminal that obtains and detects the pressure change on the touchscreen.

Figure 2:
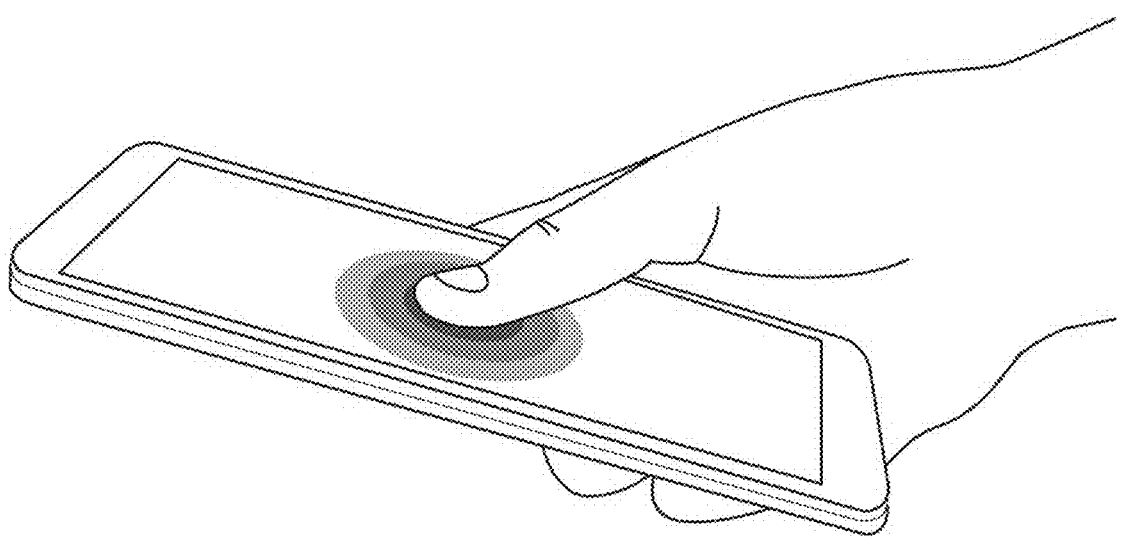
FIG. 2 is a schematic diagram of an operation on a screen of a mobile terminal according to an embodiment of the present invention.

FIG. 2 is a schematic diagram of an operation on a screen of a mobile terminal according to an embodiment of the present invention. As shown in FIG. 2, when a user presses a touchscreen that has a press sensing function, the mobile terminal identifies a press touch of the user.

Figure 3A:
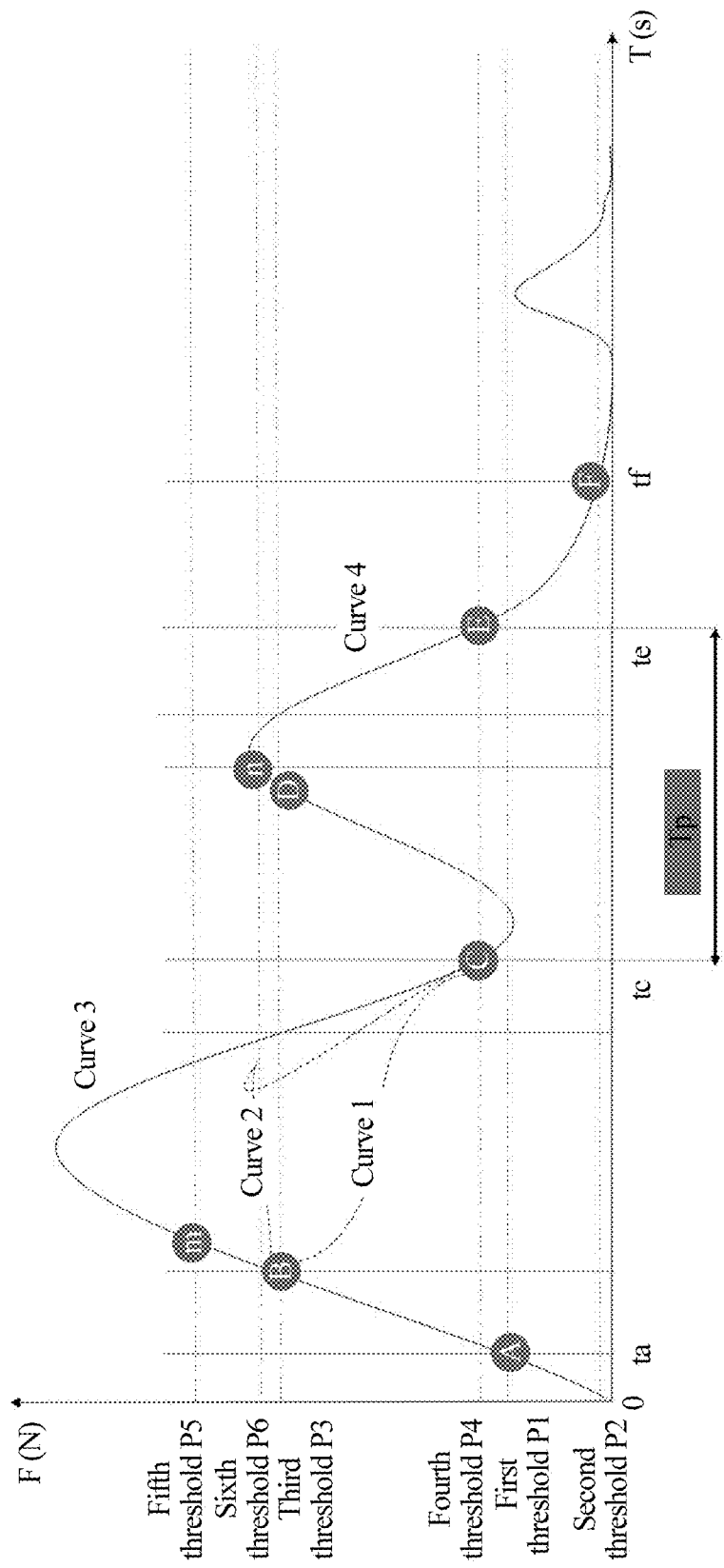
FIG. 3A is a schematic diagram of a pressure change generated by a user gesture on a touchscreen.

FIG. 3A is a schematic diagram of a pressure change generated by a user gesture on a touchscreen. FIG. 3A shows a diagram of a two-dimensional relationship between time and pressure of a gesture detected by a touchscreen. In FIG. 3A, a horizontal coordinate represents time, and a unit is second (S). A vertical coordinate represents a pressure value of the gesture, and a unit of the vertical coordinate is newton (N).

The pressure value of the gesture is a continuous pressure value, and may be represented by an analog parameter of the pressure value. For example, a pressure value of a press touch is represented as 1.1 N or 1.2 N. In addition, the pressure value of the gesture may be a discrete pressure value. That is, the pressure value may be represented by a digital parameter of the pressure value. For example, when the pressure value of the gesture acting on the touchscreen is within a range of (0, 0.5), the pressure value of the gesture is represented as 0 N. When the pressure value of the gesture acting on the touchscreen is within a range of (0.5, 1), the pressure value of the press touch is represented as 1 N.

As shown in FIG. 3A, a point A represents a starting point at which change information of the pressure value of the gesture starts to be recorded. In this case, the pressure value of the gesture exceeds a first threshold P1.

When the pressure on the screen pressed by a user is greater than the first threshold P1, the mobile terminal starts to record the change information of the pressure value of the gesture. This moment is used as a start time point ts at which a change of the pressure value of the gesture is recorded. The first threshold is set by the user, or preset by the mobile terminal at factory delivery.

A point B indicates that the pressure value of the gesture is a third threshold P3.

A point m indicates that the pressure value of the gesture is a fifth threshold P5.

A point C indicates that the pressure value of the gesture is a fourth threshold P4.

A point D indicates that the pressure value of the gesture is the third threshold P3.

A point n indicates that the pressure value of the gesture is a sixth threshold P6.

A point E indicates that the pressure value of the gesture is the fourth threshold P4.

A point F represents an ending point at which recording of the change information of the pressure value of the gesture stops. In this case, the pressure value of the gesture is lower than a second threshold P2.

The second threshold P2 is a pressure value detected by the touchscreen when a finger of the user leaves the touchscreen. To ensure that the change information of the pressure value is recorded, the finger of the user continuously acts on the touchscreen. When the pressure value is lower than the second threshold P2, recording of the change information of the pressure value stops. This moment is used as the end time point te at which recording of the pressure value change of the press touch stops. Still further, the second threshold P2 is zero.

FIG. 3A shows that the mobile terminal detects the gesture on the touchscreen, and records the change information of the pressure value from the start time ts at which the pressure value of the gesture starts to be recorded to the end time te at which recording of the pressure value stops, where

P5>P6≥P3>P4≥P1≥P2.

Specifically, if the change information of the pressure value indicates that a first event occurs, the gesture is considered to include one effective screen press. The first event is as follows: The pressure value of the gesture is reduced from being greater than the third threshold P3 to being less than the fourth threshold P4 once, where P3>P4≥P1≥P2.

As shown in FIG. 3A, when magnitude of the pressure on the touchscreen is reduced from being greater than magnitude of pressure of the point B to being less than magnitude of pressure of the point C, the press is an effective screen press. As shown in FIG. 3A, there are three curves indicating that the magnitude of the pressure on the touchscreen is reduced from the pressure of the point B to being less than the magnitude of the pressure of the point C. Although a curve 2 and a curve 3 have different tracks, the magnitude of the pressure on the touchscreen is changed from being greater than the pressure of the point B to being less than the magnitude of the pressure of the point C. Therefore, the pressure change on the touchscreen in the curve 2 and the curve 3 is identified as one effective screen press. The pressure on the touchscreen in a curve 1 is reduced from the point B to the point C, and a case in which the pressure is greater than the pressure of the point B does not occur. Therefore, the press represented by the curve 1 is not one effective screen press. FIG. 3A is merely a schematic diagram of the pressure change on the touchscreen. Regardless of whether the track of the pressure change is arc-shaped, zigzag, or the like herein, when it is identified that the magnitude of the pressure is reduced from being greater than the third threshold P3 to the fourth threshold P4, the press is one effective screen press. The third threshold P3 and the fourth threshold P4 are set by the user, or preset by the mobile terminal at factory delivery. FIG. 3A is used as an example. It should be noted that, when the pressure change is recorded, that the magnitude of the pressure of the gesture is reduced from being greater than the point B to being less than the point C needs to be recorded, and this is considered as one effective screen press. If the magnitude of the touch pressure is directly reduced from the point B to the point C, one effective screen press cannot be identified.

Specifically, if the change information of the pressure value indicates that a second event occurs, the gesture is considered to include one effective screen press, and this effective screen press is a hard press. The second event is as follows: The pressure value of the gesture is reduced from being greater than the fifth threshold P5 to being less than the fourth threshold P4 once, where P5>P3>P4≥P1≥P2.

As shown in FIG. 3A, when the pressure value of the gesture is reduced from being greater than the fifth threshold P5 to being less than the fourth threshold P4, the pressure value detected by the mobile terminal is reduced from being greater than the point m to being less than the point C. This is one effective hard press. The curve 3 in FIG. 3A indicates that the second event occurs. Therefore, the gesture is considered to include one effective screen press, and this effective screen press is a hard press.

Specifically, if the change information of the pressure value indicates that a third event occurs, the gesture is considered to include one effective screen press, and this effective screen press is a light press. The third event is as follows: The pressure value of the gesture is reduced from being greater than the sixth threshold P6 to being less than the fourth threshold P4 once, and the pressure value of the gesture is less than the fifth threshold P5, where P5>P6≥P3>P4≥P1≥P2. As shown in FIG. 3A, when the pressure value of the gesture is reduced from being greater than the sixth threshold P6 to being less than the fourth threshold P4, and the change information of the pressure value indicates that the pressure value of the gesture is less than the fifth threshold P5, that is, when the pressure value detected by the mobile terminal is reduced from being greater than the point n to being less than the point E, and the detected pressure value is less than the P5 in the figure, this is one effective light press. A press represented by a curve 4 in FIG. 3A is one effective screen press, and this effective screen press is a light press. Similarly, the pressure value in the curve 2 is reduced from being greater than the sixth threshold P6 to being less than the fourth threshold, and the pressure value of the press touch in the curve 2 is less than the fifth threshold P5. That is, a press represented by the curve 2 is also one effective screen press, and this effective screen press is a light press.

Figure 3B:
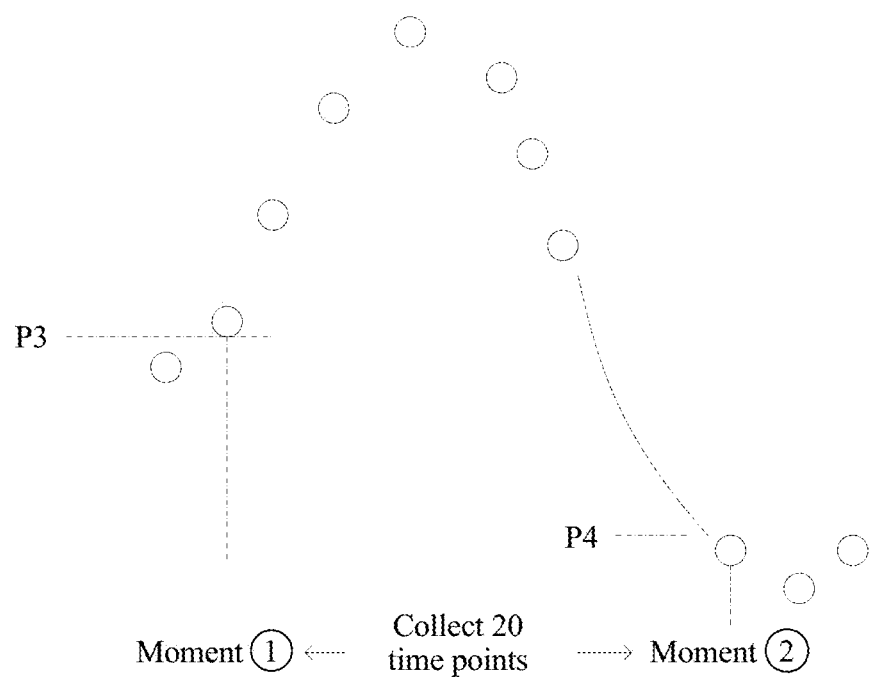
FIG. 3B is a schematic diagram of a relationship between time and pressure data that is of a user gesture and that is collected by a mobile terminal.

Specifically, as shown in FIG. 3B, the mobile terminal records the change information of the pressure value of the gesture by collecting the pressure value of the gesture at a time interval. For example, the mobile terminal collects a frame of data at an interval of 0.01 s, and records a pressure data frame of a gesture collected at each time point. When the time interval is shorter, more data is collected, and the mobile terminal can more accurately identify at least two consecutive effective screen presses of the press gesture.

In the beginning, a pressure value of the gesture recorded at a moment □ is greater than the third threshold P3. Pressure values of gestures collected at 20 time points between the moment □ and a moment □ are compared with the third threshold P3, and are compared with the fourth threshold P4. When a pressure value of the gesture recorded at the moment □ is less than the fourth threshold P4, a first event occurs. The gesture is considered to include one effective screen press. The first event is as follows: The pressure value of the gesture is reduced from being greater than the third threshold P3 to being less than the fourth threshold P4 once, where P3>P4≥P1≥P2.

When at least two effective screen presses are identified, if a time interval between the two effective screen presses is greater than a first time interval T1 and less than a second time interval T2, the two screen presses are considered as two consecutive effective screen presses. For example, as shown in FIG. 3A, that the pressure is changed from being greater than the pressure of the point B to being less than magnitude of the pressure of the point C is identified as one effective screen press. That the pressure is changed from being greater than magnitude of the pressure of the point D to being less than the pressure of the point E is identified as one effective screen press. A time interval between the two effective screen presses is calculated starting from a moment at which a pressure value in the first effective press is less than the fourth threshold P4. The moment at which the pressure value is less than the fourth threshold P4 for the first time is recorded as tc. A moment at which a pressure value is less than the fourth threshold P4 for the second time is recorded as te. The time interval Tp between the two effective screen presses is the time interval between te and tc.

In FIG. 3A, the time interval Tp between the effective screen press from the points B to C and the effective screen press from the points D to E is greater than the first time interval T1 and less than the second time interval T2. The two presses are considered as two consecutive effective screen presses. The first time interval T1 and the second time interval T2 are set by the user, or preset by the mobile terminal at factory delivery. When the foregoing parsing of the recorded change information indicates that the gesture includes at least two consecutive effective screen presses, the gesture is determined to match with a first instruction. The first instruction is an instruction to display a suspend icon, an instruction to display a home screen, an instruction to display switching from an unlock screen to a home screen, an instruction to display that a screen is triggered to be screen-off, screen-on, unlocked, and enter a home screen, an instruction to display a last displayed screen before a screen is off, or an instruction to display a preset unlock screen.

The gesture that includes at least two consecutive effective screen presses is determined as the first instruction. More specifically, after it is determined that the gesture includes at least two consecutive effective screen presses, the first instruction is responded. The instruction to display a suspend icon is responded, the instruction of a gesture for displaying a home screen is responded, or the instruction to display switching from an unlock screen to a home screen is responded.

In the foregoing embodiment, the first instruction is set by the mobile terminal at factory delivery or set by the user itself. The first instruction is set by the user or at factory delivery. The first instruction is also defined as an instruction to adjust a volume, an instruction to display user preference, or an instruction to display user favorites. This is not specifically limited herein.

In response to the first instruction, the suspend icon is displayed on the touchscreen, the instruction of the home screen is displayed on the touchscreen, or the home screen entered after unlocking is displayed on the touchscreen.

Figures 4A, 4B:
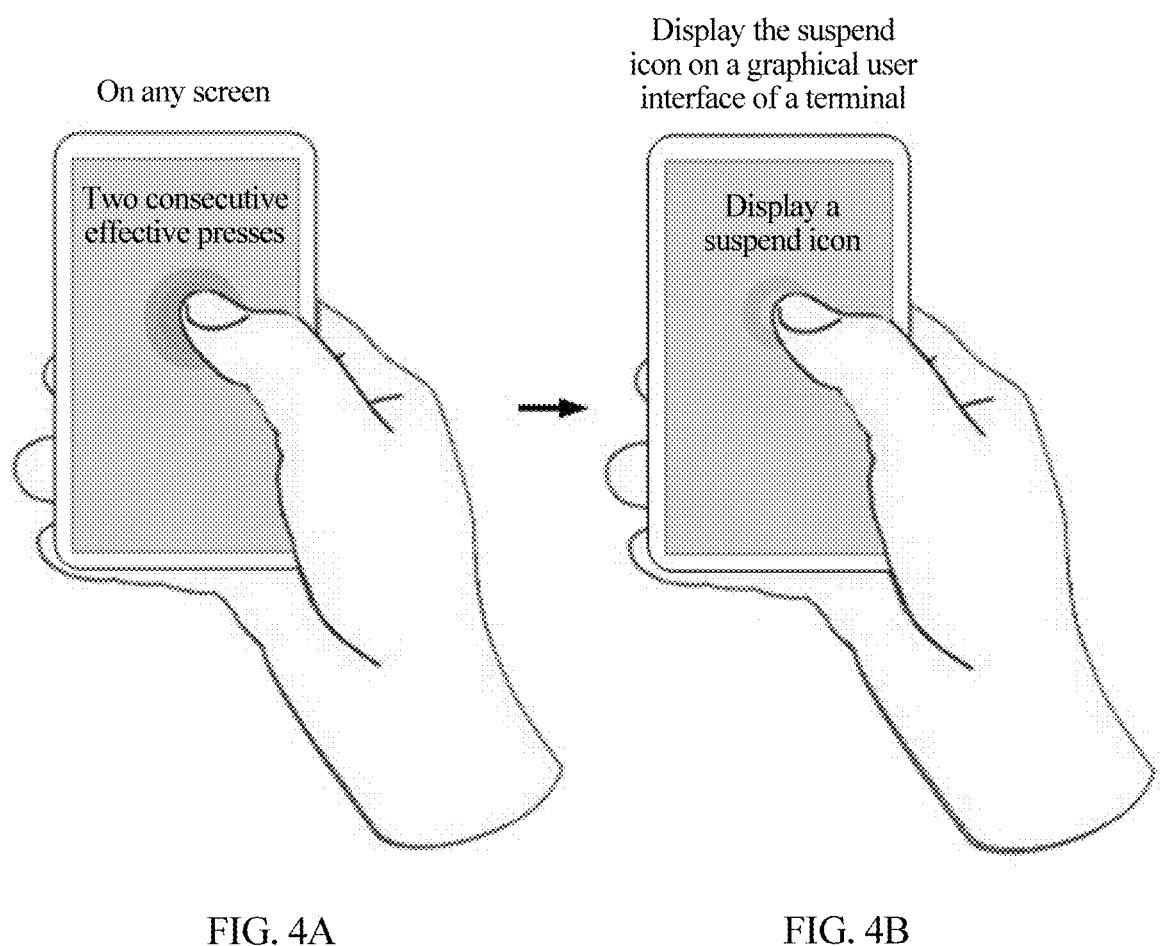
FIG. 4A and FIG. 4B are schematic diagrams of a graphical user interface presented by a mobile terminal in response to a user gesture.

FIG. 4A and FIG. 4B are schematic diagrams of a graphical user interface presented by a mobile terminal in response to a user gesture. As shown in FIG. 4A, in a case in which a finger stays on a screen, the user exerts, on any screen of the mobile terminal, a gesture that includes two consecutive effective screen presses on the touchscreen. A suspend icon is displayed on the graphical interface on the touchscreen of the mobile terminal shown in FIG. 4B. Specifically, a scenario in which the user is playing a full-screen game on the mobile terminal is used as an example. When the user is playing the full-screen game on the mobile terminal, in this case, if the user needs to operate a task and a program in a settings menu, the user needs to exit the game level by level, enter the settings menu again, and select the task and the program that need to be operated. This manner is tedious in displaying the settings menu, an operation is inconvenient, and user experience is poor. If the user uses two consecutive effective presses of the finger that stays on the screen when playing the full-screen game, to display the suspend icon, the user can click the suspend icon to display the settings menu. In this case, the suspend icon is displayed while the user does not exit the full-screen game. This improves task process processing efficiency of a processor of the mobile terminal, properly uses a memory resource, and further improves user experience.

Figures 5A, 5B:
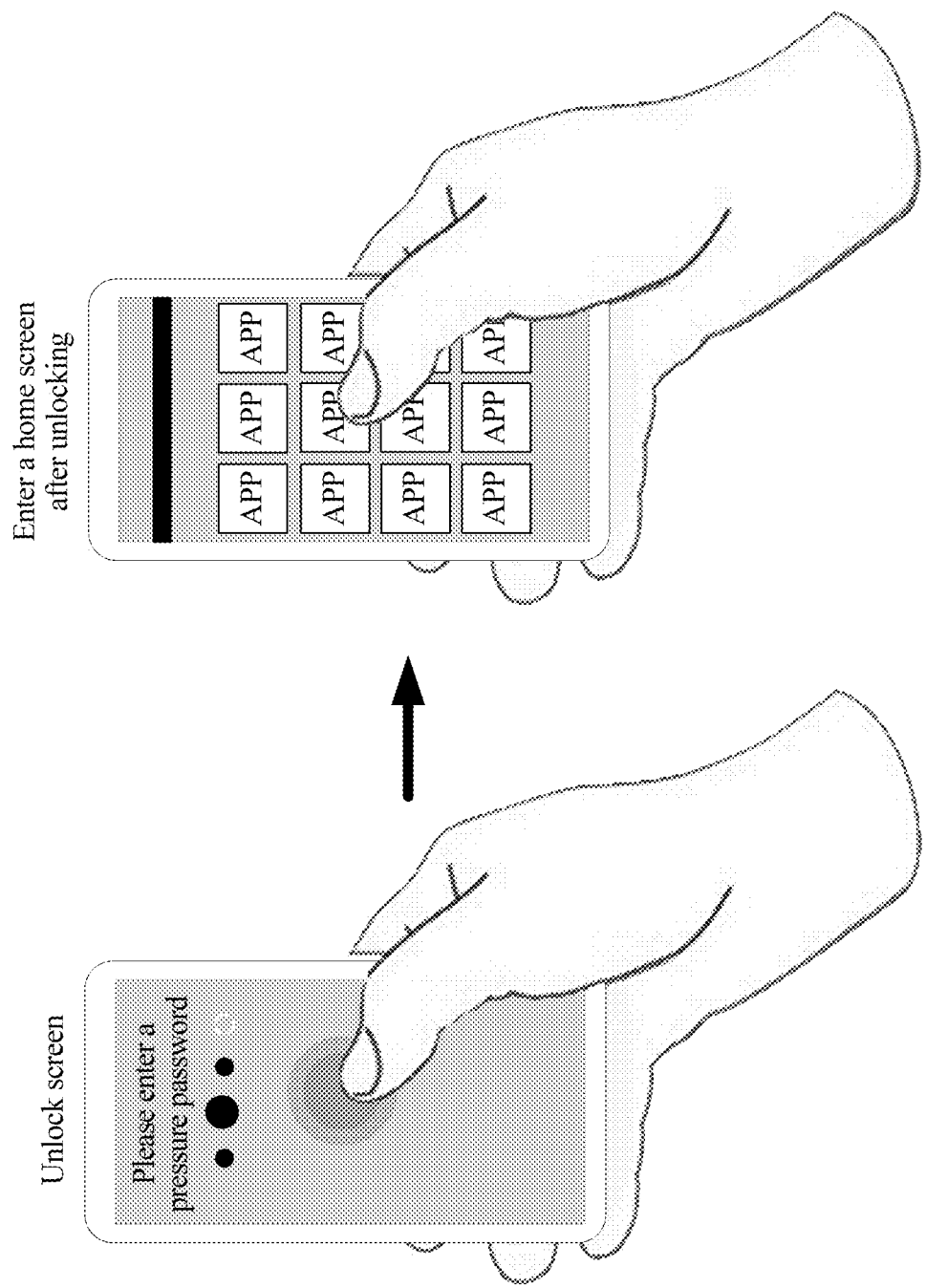
FIG. 5A and FIG. 5B are schematic diagrams of another graphical user interface presented by a mobile terminal in response to a user gesture.

FIG. 5A and FIG. 5B are schematic diagrams of another graphical user interface presented by a mobile terminal in response to a user gesture. As shown in FIG. 5A, in a case in which a finger stays on a screen, the user exerts, on a to-be-unlocked screen of the mobile terminal, a gesture that includes four consecutive effective presses. As shown in FIG. 5B, the mobile terminal is unlocked, and a home screen entered after unlocking is displayed on the touchscreen. The screen is unlocked by using four consecutive effective presses. This efficiently improves unlocking security of the mobile terminal, greatly improves efficiency of unlocking the screen by the user, and improves user experience.

FIG. 6 shows a schematic diagram of entering a home screen after a user exerts a gesture that includes four consecutive effective presses on a mobile terminal to unlock the mobile terminal.

Figure 6A:
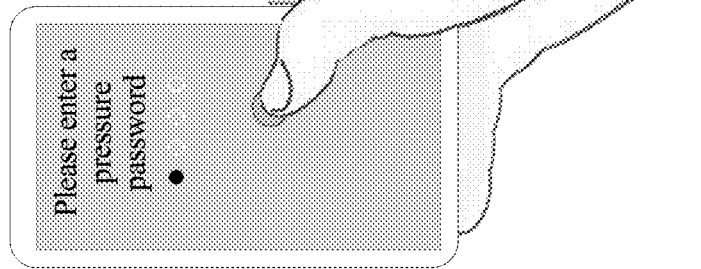
Figure 6B:
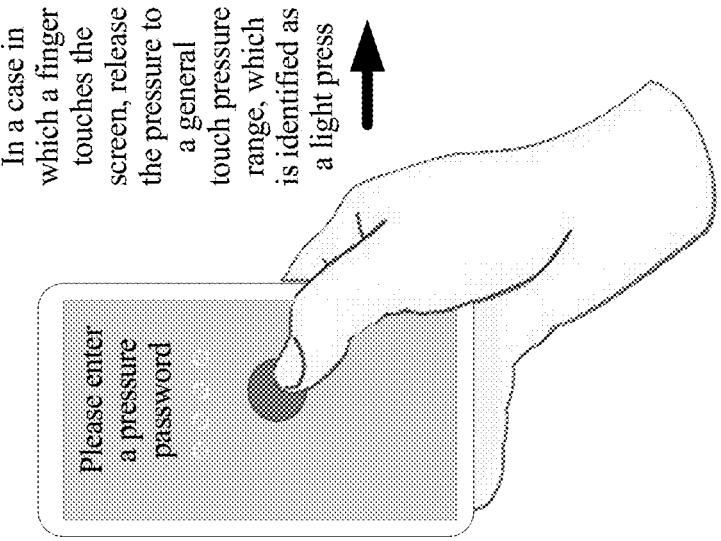
Figure 6C:
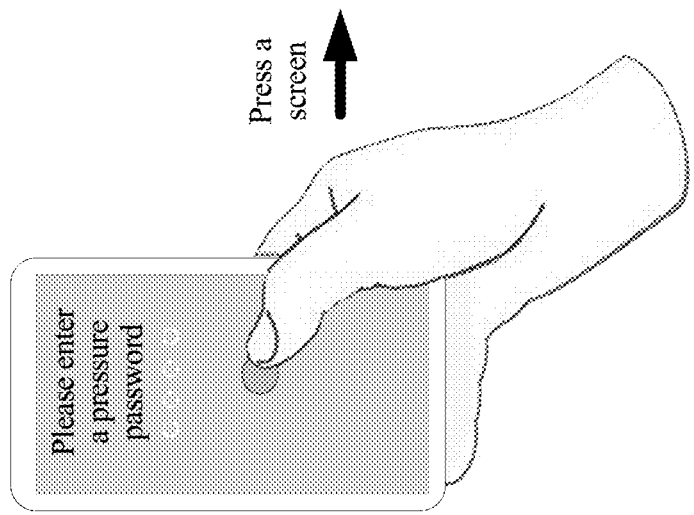

As shown in FIG. 6a, FIG. 6b, and FIG. 6c, in FIG. 6a, the user starts to press a screen. When a pressure value of the gesture exceeds a first threshold P1, the mobile terminal starts to record change information of the pressure value of the gesture. If the change information of the pressure value indicates that the following third event (shown in FIG. 6b) occurs, the gesture is considered to include one effective screen press, and this effective screen press is a light press. Therefore, a light press password is generated, as shown in FIG. 6c. The third event is as follows: The pressure value of the gesture is reduced from being greater than a sixth threshold P6 to being less than a fourth threshold P4 once, and the pressure value of the gesture is less than a fifth threshold P5, where $P5>P6\geq P3>P4\geq P1\geq P2$.

As shown in FIG. 6c, FIG. 6d, and FIG. 6e, in FIG. 6c, in a case in which the user releases pressure to be greater than P2 after the last screen press, the user continues to press the screen. If the change information of the pressure value indicates that the following second event (shown in FIG. 6d) occurs, the gesture is considered to include one effective screen press, and this effective screen press is a hard press. Therefore, a hard press password is generated, as shown in FIG. 6e. The second event is as follows: The pressure value of the gesture is reduced from being greater than the fifth threshold P5 to being less than the fourth threshold P4 once, where $P5>P3>P4\geq P1\geq P2$.

Figures 6G, 6H, 6I:
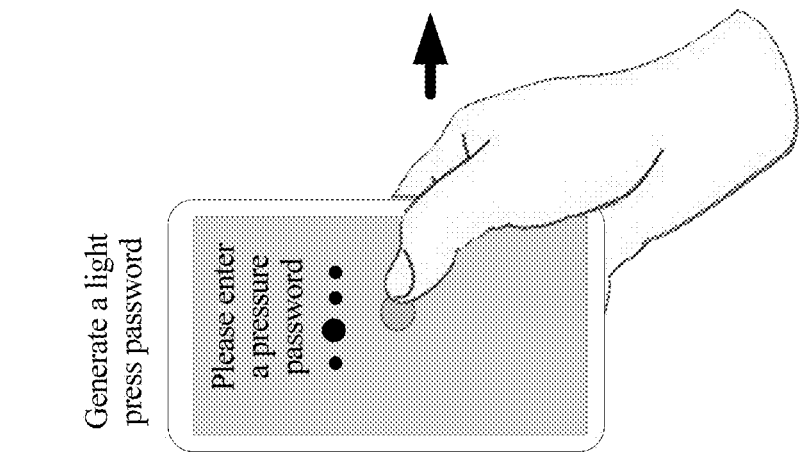

As shown in FIG. 6e, FIG. 6f, and FIG. 6g, in FIG. 6e, in a case in which the user releases pressure to be greater than P2 after the last screen press, the user continues to press the screen. If the change information of the pressure value indicates that a third event occurs, the gesture is considered to include one effective screen press, and this effective screen press is a light press. Therefore, a light press password is generated, as shown in FIG. 6g. The third event is as follows: The pressure value of the gesture is reduced from being greater than the sixth threshold P6 to being less than the fourth threshold P4 once, and the pressure value of the gesture is less than the fifth threshold P5, where $P5>P6\geq P3>P4\geq P1\geq P2$.

As shown in FIG. 6g. FIG. 6h, and FIG. 6i, in FIG. 6g, in a case in which the user releases pressure to be greater than P2 after the last screen press, the user continues to press the screen. If the change information of the pressure value indicates that a third event occurs, the gesture is considered to include one effective screen press, and this effective screen press is a light press. Therefore, a light press password is generated, as shown in FIG. 6i. The third event is as follows: The pressure value of the gesture is reduced from being greater than the sixth threshold P6 to being less than the fourth threshold P4 once, and the pressure value of the gesture is less than the fifth threshold P5, where $P5>P6\geq P3>P4\geq P1\geq P2$.

As shown in FIG. 6a to FIG. 6i, when parsing of the change information of the pressure value by the mobile terminal indicates that the gesture includes four consecutive effective screen presses, the mobile terminal determines that the gesture matches a first trigger instruction. The four consecutive effective screen presses are a "light-hard-light-light" press gesture. The first instruction is an instruction to unlock the mobile terminal.

As shown in FIG. 6j, in response to the instruction to unlock the mobile terminal, a graphical user interface of a home screen is presented on the touchscreen.

In this embodiment of the present invention, in a case in which a finger stays on the screen, when detecting a gesture that includes four consecutive effective screen presses, the mobile terminal determines that the gesture matches the instruction to unlock the mobile terminal, and presents the graphical user interface of the unlocked home screen on the touchscreen. The user is provided with a more diversified manner to unlock the screen with reference to an advantage of the touchscreen that has a press sensing function and a tedious problem of unlocking the screen. A more humanized manner to unlock the screen is provided by using at least two consecutive effective screen presses. Security of unlocking the screen is improved in combination with multiple password-unlock combinations of a light press and a hard press. User experience of the mobile terminal is improved to a great extent, and the user is provided with more convenient and easy-to-use manners to unlock the screen.

In this embodiment of the present invention, when detecting that a gesture includes at least two consecutive effective screen presses, and a pressure value is greater than the first threshold P1 and less than the second threshold P2, the mobile terminal determines that the gesture matches the first instruction. With this method, according to magnitude of pressure on the touchscreen pressed by the user, a corresponding user gesture is responded. With this method, precision of identifying a user press gesture by the touchscreen of the mobile terminal is improved, a problem that it is difficult for the touchscreen to distinguish a long press from the press gesture is resolved, and user experience is improved. Still further, multiple types of press gestures are combined. This enriches a means by which the user interacts with the mobile terminal, and increases diversity of gestures entered on the mobile terminal.

Figure 7A:
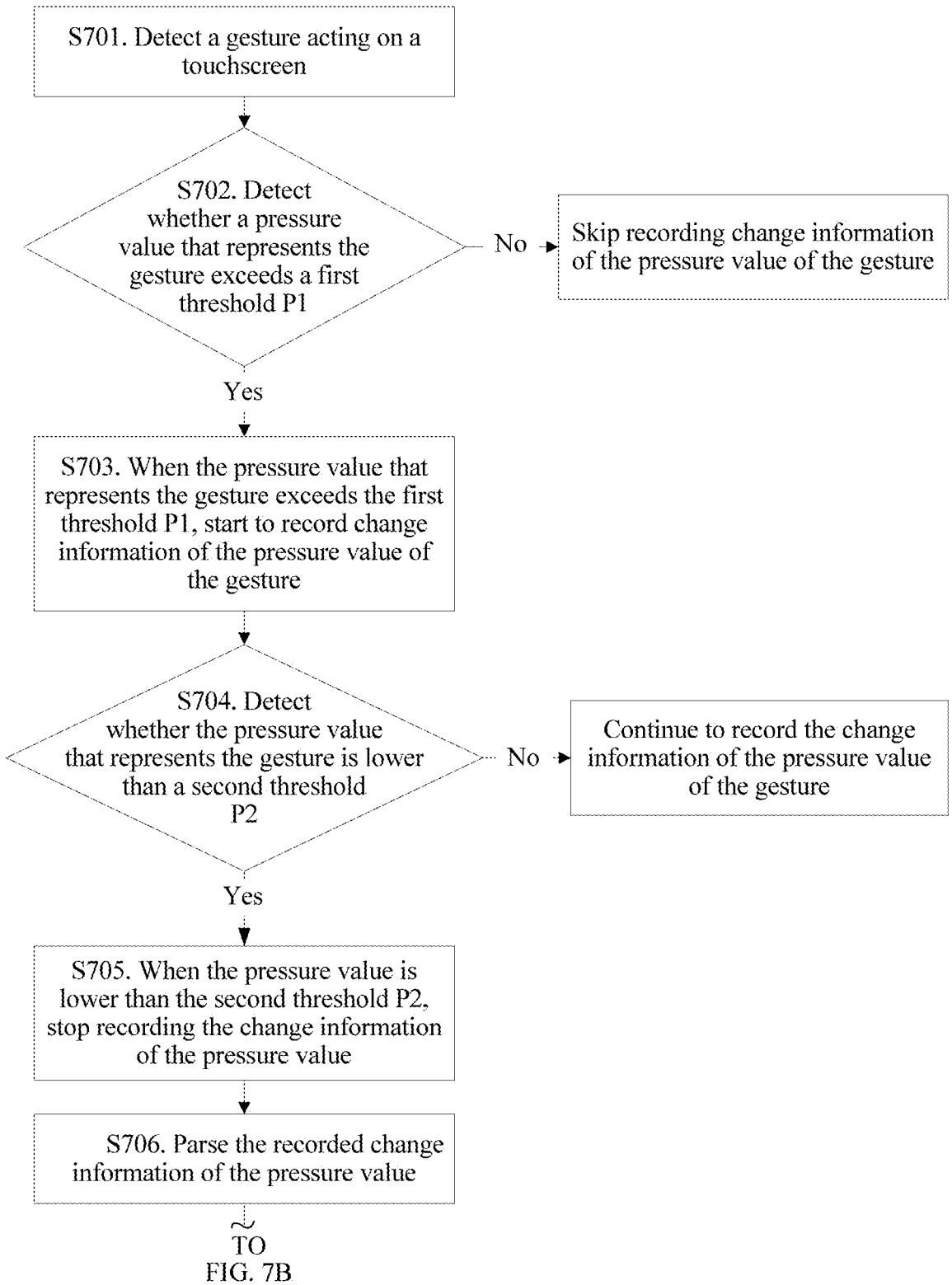
FIG. 7A and FIG. 7B are a schematic flowchart of a method for responding to a gesture acting on a touchscreen according to an embodiment of the present invention.
Figure 7B:
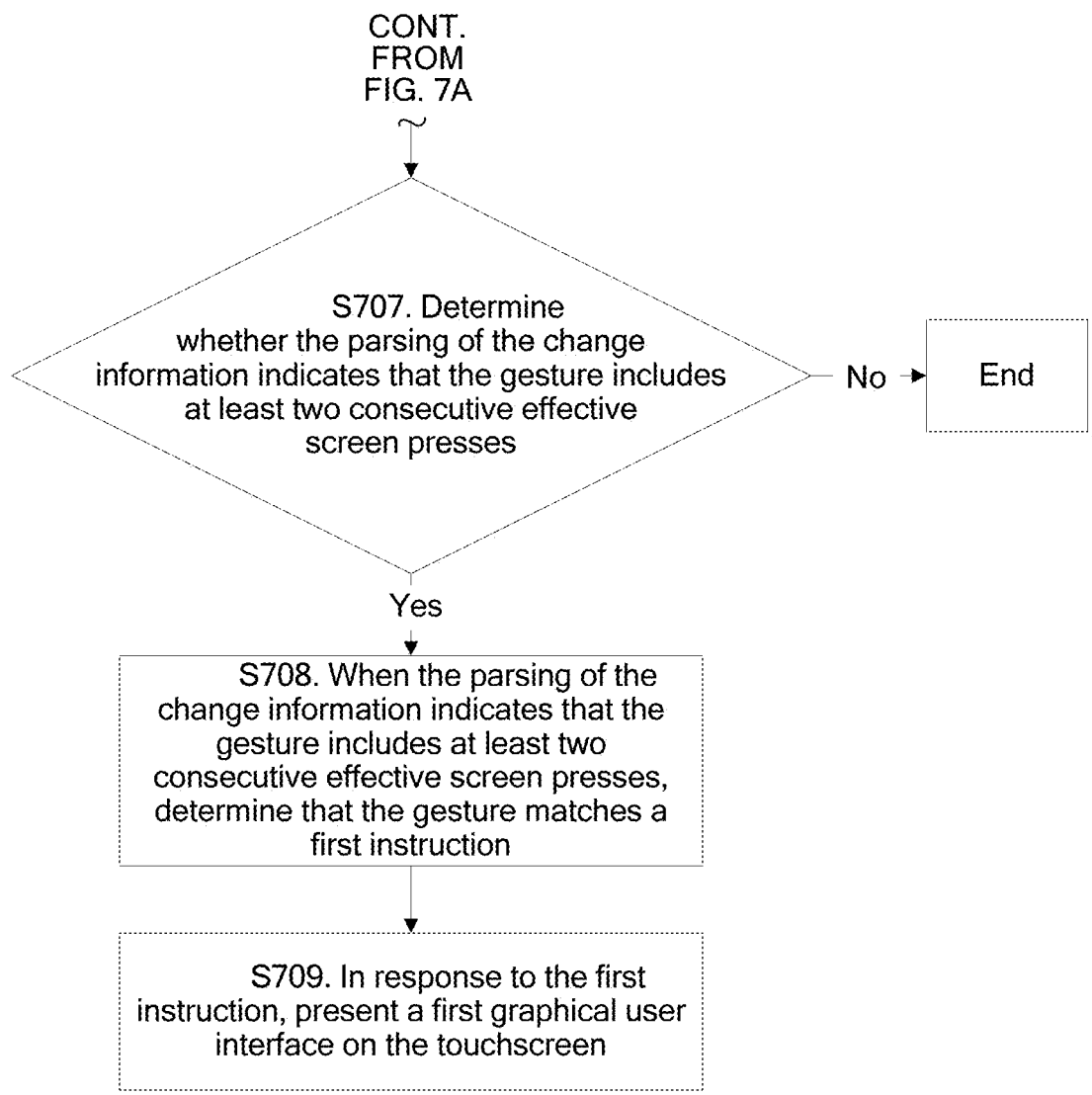

FIG. 7A and FIG. 7B show a method for responding to a gesture acting on a touchscreen according to an embodiment of the present invention. The method includes the following steps.

S701. Detect a gesture acting on a touchscreen.

A mobile terminal implements detection of a press touch by using the foregoing touchscreen that has a press sensing function.

S702. Detect whether a pressure value of the gesture exceeds a first threshold P1.

S703. When the pressure value of the gesture exceeds the first threshold P1, start to record change information of the pressure value of the gesture.

At the point A in FIG. 3A, the change information of the pressure value of the gesture starts to be recorded at a moment ta.

S704. Detect whether the pressure value of the gesture is lower than a second threshold P2.

S705. When the pressure value is lower than the second threshold P2, stop recording the change information of the pressure value.

At the point F in FIG. 3A, the change information of the pressure value of the gesture starts to be recorded at a moment tf.

S706. Parse the recorded change information of the pressure value.

According to the recorded change information of the pressure value, the change information of the pressure value is parsed. Parsing the recorded change information of the pressure value is as follows: A pressure value of press touch is collected at a time interval, and pressure values collected at different times are compared with a threshold. For a specific parsing process, refer to a corresponding description of FIG. 3A.

S707. Determine whether the parsing of the change information indicates that the gesture includes at least two consecutive effective screen presses.

S708. When the parsing of the change information indicates that the gesture includes at least two consecutive effective screen presses, determine that the gesture matches a first instruction.

The parsing of the change information is described in detail in a corresponding description of FIG. 3A. A process of matching the gesture with the first instruction is described in detail in the embodiment corresponding to FIG. 3A.

S709. In response to the first instruction, present a first graphical user interface on the touchscreen.

For a process of presenting the first graphical user interface on the touchscreen in response to the first instruction, refer to the foregoing description of the graphical user interface in FIG. 4A to FIG. 4B, FIG. 5A to FIG. 5B, and FIG. 6a to FIG. 6j.

In this embodiment of the present invention, when there is a gesture that includes at least two consecutive effective screen presses, the gesture is responded. This improves precision of identifying a press gesture by the touchscreen using press sensing, resolves a problem that it is difficult for the touchscreen to distinguish a long press gesture from the press gesture, and improves user experience. Still further, the mobile terminal can define multiple types of gesture instructions by defining multiple types of press gestures such as a light press and a hard press. This can enrich a means by which a user interacts with the mobile terminal, for example, the means is used to set a screen password unlocking gesture of the touchscreen. This can increase diversity of gestures entered on the mobile terminal.

Figure 8:
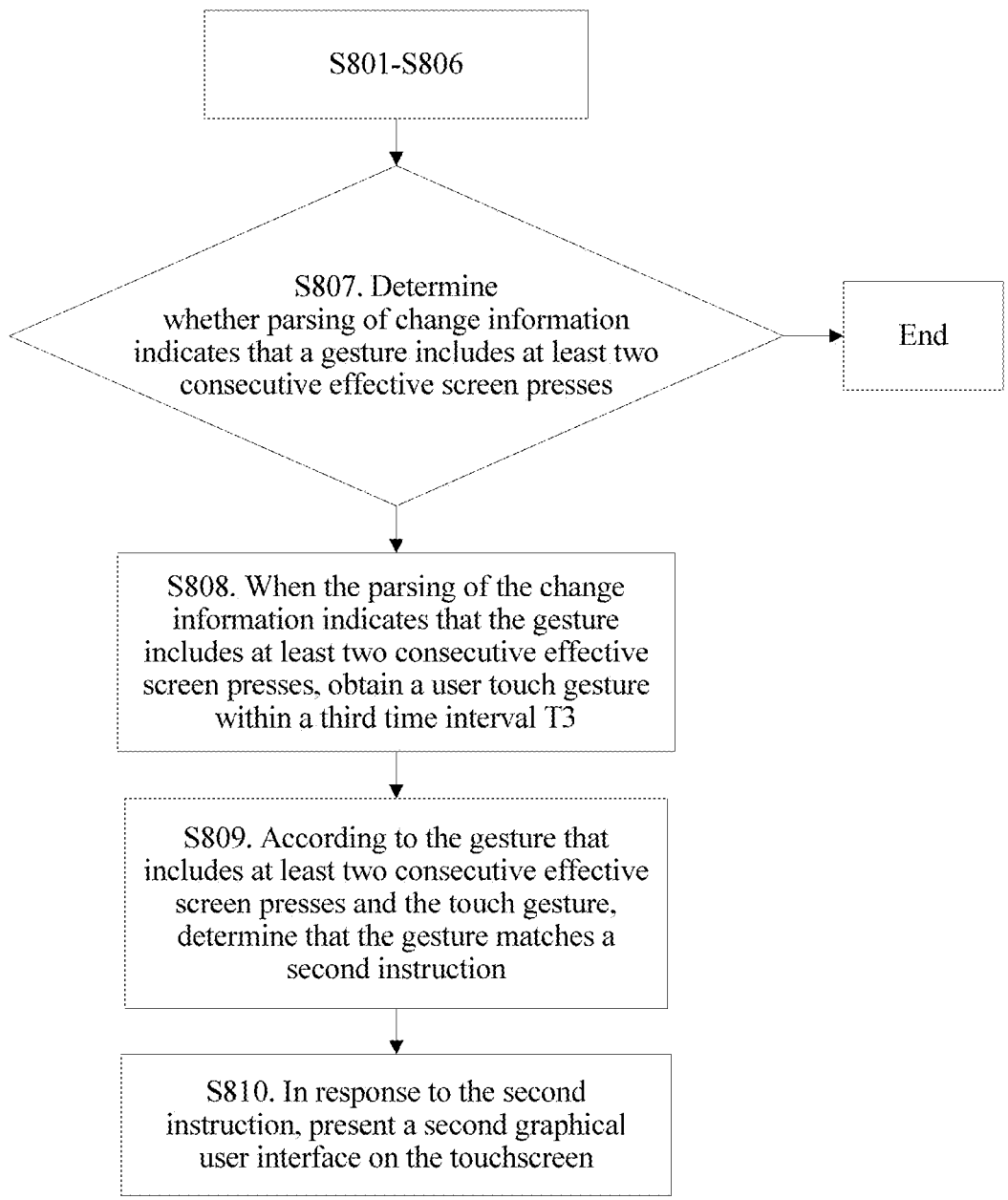
FIG. 8 is a schematic flowchart of a method for responding to a gesture acting on a touchscreen according to another embodiment of the present invention.

As shown in FIG. 8, in another embodiment of the present invention, another method for responding to a gesture acting on a touchscreen is provided.

In the method, steps S801 to S807 are described in detail in steps S701 to S707.

S808. When the parsing of the change information indicates that the gesture includes at least two consecutive effective screen presses, obtain a user touch gesture within a third time interval T3.

The user touch gesture includes a slide, a long press, or a tap.

S809. According to the gesture that includes at least two consecutive effective screen presses and the touch gesture, determine that the gesture matches a second instruction.

S810. In response to the second instruction, present a second graphical user interface on the touchscreen.

Presenting the second graphical user interface on the touchscreen includes: presenting a screen split or presenting a graphical user interface of screen switching.

For example, the user touch gesture is a slide gesture. After at least two consecutive effective screen presses are determined, the user slide touch gesture is obtained within the third time interval T3. According to the at least two consecutive effective screen presses and the user slide touch gesture, it is determined that the gesture matches the second instruction. In response to the second instruction, the graphical user interface of screen switching is presented on the touchscreen. Within the third interval, the user gesture that includes at least two consecutive effective screen presses is combined with the conventional user touch gesture, so that the graphical user interface is displayed on the touchscreen in response to the instruction. In this manner, multiple types of press gestures and another type of gesture are combined. Combinations of the multiple types of press gestures and multiple gestures can enrich a means by which the user interacts with the mobile terminal, and increase diversity of gestures entered on the mobile terminal.

Figure 9:
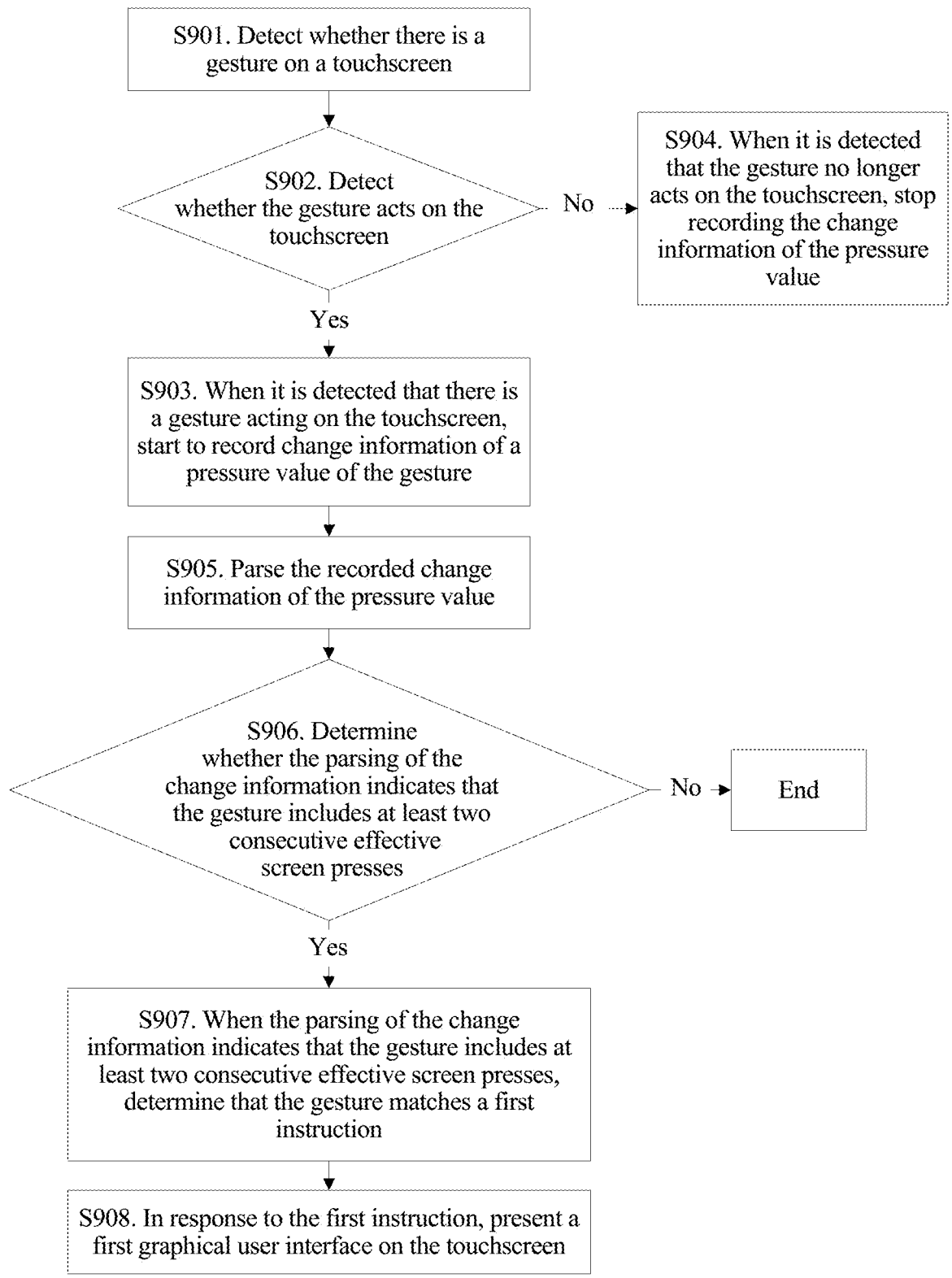
FIG. 9 is a schematic flowchart of a method for responding to a gesture acting on a touchscreen according to another embodiment of the present invention.

FIG. 9 provides another method for responding to a gesture acting on a touchscreen according to an embodiment of the present invention. The method includes the following steps:

S901. Detect whether there is a gesture on a touchscreen.

S902. Detect whether a gesture is acting on the touchscreen.

S903. When it is detected that there is a gesture acting on the touchscreen, start to record change information of a pressure value of the gesture.

S904. When it is detected that the gesture no longer acts on the touchscreen, stop recording the change information of the pressure value.

S905. Parse the recorded change information of the pressure value.

S906. Determine whether the parsing of the change information indicates that the gesture includes at least two consecutive effective screen presses.

S907. When the parsing of the change information indicates that the gesture includes at least two consecutive effective screen presses, determine that the gesture matches a first instruction.

S908. In response to the first instruction, present a first graphical user interface on the touchscreen.

In this embodiment of the present invention, when there is a gesture that includes at least two consecutive effective screen presses, the gesture is responded. This can improve precision of identifying a press gesture by the touchscreen using press sensing, resolve a problem that it is difficult for the touchscreen to distinguish a long press from the press gesture, and improve user experience.

Figure 10:
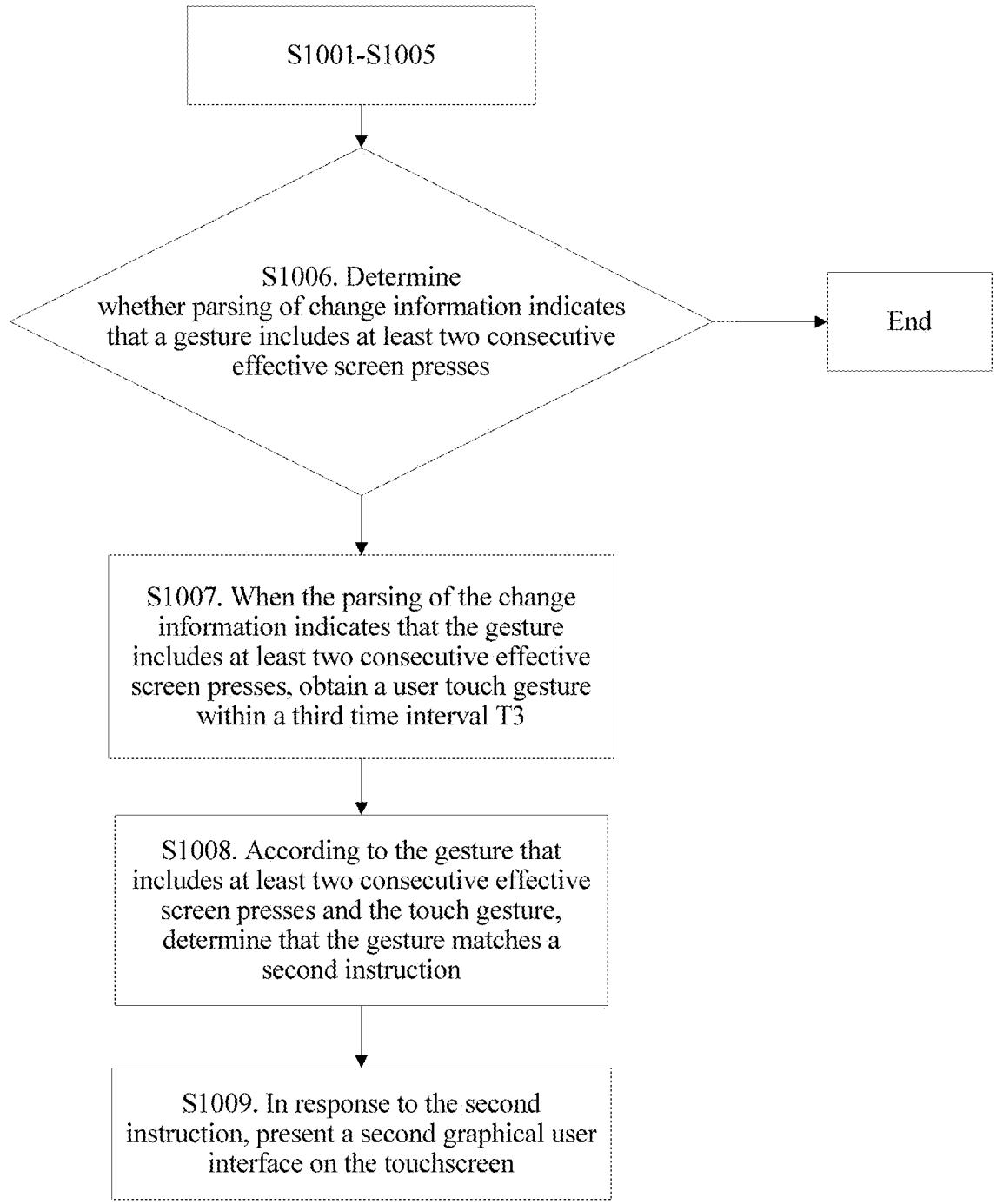
FIG. 10 is a schematic flowchart of a method for responding to a gesture acting on a touchscreen according to another embodiment of the present invention.

FIG. 10 provides another method for responding to a gesture acting on a touchscreen according to an embodiment of the present invention. The method includes the following steps:

Steps 1001 to 1006 are the same as steps 901 to 906 that are described in detail in FIG. 9.

S1007. When the parsing of the change information indicates that the gesture includes at least two consecutive effective screen presses, obtain a user touch gesture within a third time interval T3.

S1008. According to the gesture that includes at least two consecutive effective screen presses and the touch gesture, determine that the gesture matches a second instruction.

S1009. In response to the second instruction, present a second graphical user interface on the touchscreen.

In this embodiment of the present invention, the mobile terminal can define multiple types of gesture instructions by defining multiple types of press gestures such as a light press and a hard press. The multiple types of press gestures may further be combined with another type of gesture. Combinations of the multiple types of press gestures and multiple gestures can enrich a means by which the user interacts with the mobile terminal, and provide the mobile terminal with more response combinations, for example, the means is used to set a screen password unlocking gesture of the touchscreen. This can increase diversity of gestures entered on the mobile terminal.

Figure 11:
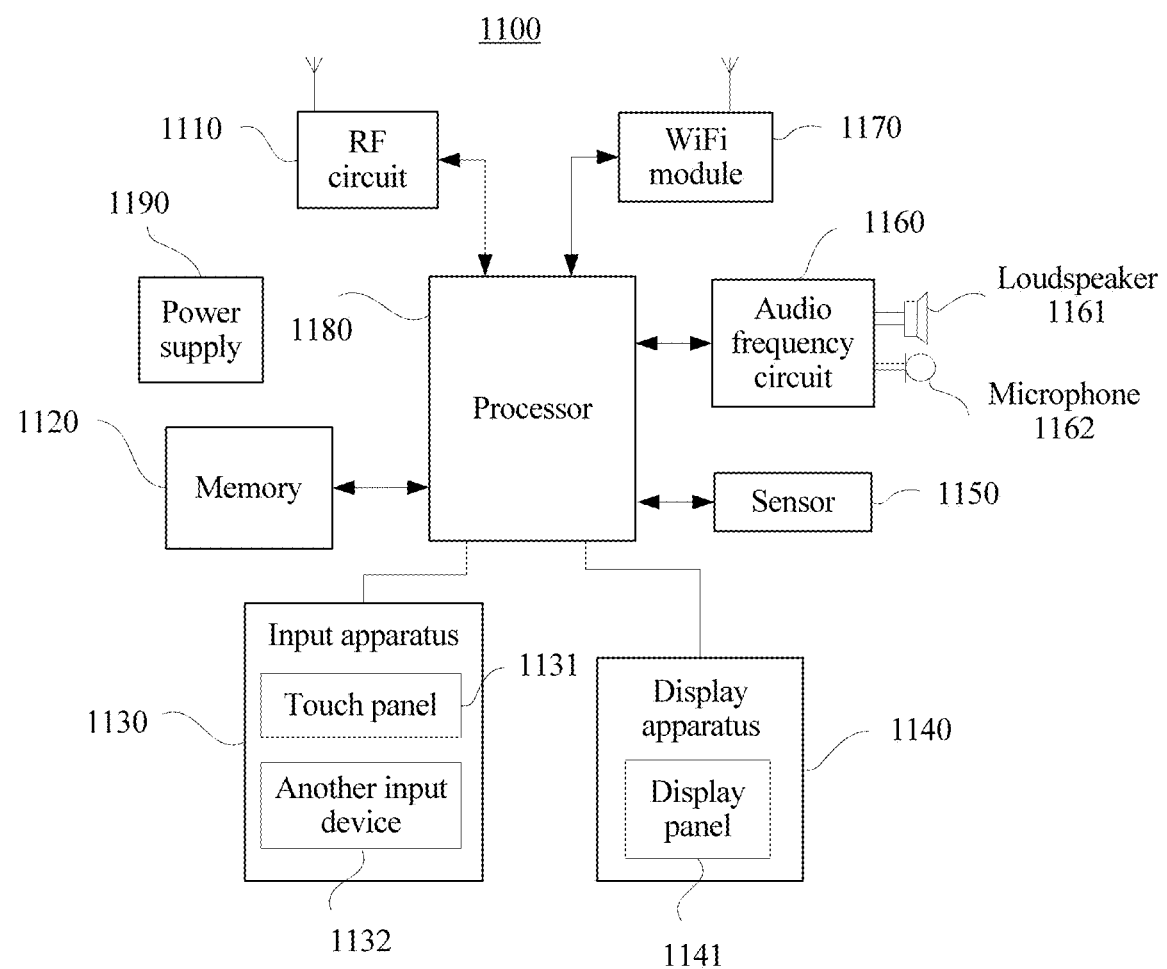
FIG. 11 is a schematic diagram of a hardware structure of a terminal 1100 according to an embodiment of the present invention.

A mobile terminal in FIG. 11 shows a connection relationship between a touchscreen and another hardware apparatus, and may be configured to perform the method described in the foregoing embodiment of the present invention.

The mobile terminal is a terminal device that includes a mobile phone, a tablet computer, a PDA (Personal Digital Assistant, personal digital assistant), a POS (point of sales, point of sale), a vehicle-mounted computer, or the like. An example in which the mobile terminal is the mobile phone is used. FIG. 11 shows a block diagram of a partial structure of a mobile phone 1100 related to the terminal provided in this embodiment of the present invention. Referring to FIG. 11, the mobile phone 1100 includes components such as an RF (Radio Frequency, radio frequency) circuit 1110, a memory 1120, an input unit 1130, a display unit 1140, a sensor 1150, an audio frequency circuit 1160, a WiFi (wireless fidelity, Wireless Fidelity) module 11110, a processor 1180, and a power supply 1190. A person skilled in the art understands that, the mobile phone structure shown in FIG. 11 is merely an example of an implementation, and does not constitute a limitation on the mobile phone, and the mobile phone includes more or fewer components than those shown in the diagram, or combines some components or has different component configurations.

In the following, each component of the mobile phone 1100 is described in detail with reference to FIG. 11.

The RF circuit 1110 may be configured to receive and send information, or receive and send a signal during a call. Particularly, the RF circuit 1110 receives downlink information from a base station, and sends the downlink information to the processor 1180 for processing; and sends uplink data to the base station. Generally, the RF circuit includes but is not limited to an antenna, at least one amplifier, a transceiver, a coupler, an LNA (Low Noise Amplifier, low noise amplifier), a duplexer, and the like. In addition, the RF circuit 1110 further communicates with a network and another device by means of wireless communication. Any communications standard or protocol is used for the wireless communication, including but not limited to GSM (Global System for Mobile communication, Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), email, SMS (Short Message Service, short message service), or the like.

The memory 1120 may be configured to store a software program and a module. By running the software program and the module stored in the memory 1120, the processor 1180 executes various function applications of the mobile phone 1100 and performs data processing. The memory 1120 may mainly include a program storage region and a data storage region. The program storage region may store an operating system, an application program required for at least one function (such as a sound playing function or an image playing function), and the like. The data storage region may store data (such as audio data or an address book) created according to use of the mobile phone 1100, and the like. In addition, the memory 1120 includes a high-speed random access memory, and further includes a nonvolatile memory such as at least one magnetic disk storage component, a flash memory component, or another volatile solid-state storage component.

The input unit 1130 may be configured to: receive entered numeral or character information, and generate key signal input related to user setting and function control of the mobile phone 1100. Specifically, the input unit 1130 may include a touch panel 1131 and another input device 1132. The touch panel 1131, also referred to as a touchscreen, may collect a touch operation performed by a user on or near the touch panel 1131 (for example, an operation performed by the user on the touch panel 1131 or near the touch panel 1131 by using any suitable object or accessory such as a finger or a stylus), and drive a corresponding connection apparatus according to a preset program. Optionally, the touch panel 1131 may include two parts: a touch detection apparatus and a touch controller. The touch detection apparatus detects a touch position of a user, detects a signal brought by the touch operation, and sends the signal to the touch controller. The touch controller receives touch information from the touch detection apparatus, converts the touch information into touch point coordinates, sends the touch point coordinates to the processor 1180, and can receive and execute a command sent by the processor 1180. In addition, the touch panel 1131 is implemented by using multiple types, such as a resistive type, a capacitive type, an infrared ray, and a surface acoustic wave. The input unit 1130 includes the another input device 1132 in addition to the touch panel 1131. Specifically, the another input device 1132 includes but is not limited to one or more of a physical keyboard, a function key (such as a volume control key or an on/off key), a trackball, a mouse, or a joystick.

The display unit 1140 may be configured to display information entered by the user or information provided for the user and various menus of the mobile phone 1100. The display unit 1140 may include a display panel 1141. Optionally, the display panel 1141 may be configured by using an LCD (Liquid Crystal Display, liquid crystal display), an OLED (Organic Light-Emitting Diode, organic light-emitting diode), or the like. Further, the touch panel 1131 may cover the display panel 1141. After detecting a touch operation on or near the touch panel 1131, the touch panel 1131 transfers the touch operation to the processor 1180 to determine a type of a touch event. Then the processor 1180 provides corresponding visual output on the display panel 1141 according to the type of the touch event. Although in FIG. 11, the touch panel 1131 and the display panel 1141 are used as two independent components to implement input and input functions of the mobile phone 1100, in some embodiments, the touch panel 1131 may be integrated with the display panel 1141 to implement the input and output functions of the mobile phone 1100.

The mobile phone 1100 may further include at least one sensor 1150 such as a light sensor, a motion sensor, or another sensor. Specifically, the light sensor may include an ambient light sensor and a proximity sensor. The ambient light sensor may adjust luminance of the display panel 1141 according to brightness of ambient light. The proximity sensor may turn off the display panel 1141 and/or backlight when the mobile phone 1100 approaches an ear of the user. As a motion sensor, an accelerometer sensor may detect a value of acceleration in different directions (usually, there are three axes), may detect a value and a direction of gravity in a static state, and may be configured to identify a mobile phone posture (such as switching between landscape and portrait, a related game, and magnetometer posture calibration), and a vibration-recognition related function (such as a pedometer and a knock), and the like. The mobile phone 1100 may be further equipped with a gyroscope, a barometer, a hygrometer, a thermometer, an infrared sensor, and another sensor, and details are not described herein.

The audio frequency circuit 1160, a loudspeaker 1161, and a microphone 1162 may provide an audio interface between the user and the mobile phone 1100. The audio frequency circuit 1160 may transmit, to the loudspeaker 1161, an electrical signal converted from received audio data, and the loudspeaker 1161 converts the electrical signal into a sound signal for output. In addition, the microphone 1162 converts a collected sound signal into an electrical signal, the audio frequency circuit 1160 converts the electrical signal into audio data upon receipt of the electrical signal and outputs the audio data to the processor 1180 for processing, and then the audio data is sent to, for example, another mobile phone, by using the RF circuit 1110, or the audio data is outputted to the memory 1120 for further processing. The mobile phone 1100 may be configured to perform the foregoing methods described in FIG. 1 to FIG. 10.

The mobile phone 1100 may further include a camera, a Bluetooth module, and the like, although not shown. Details are not described herein.

In this embodiment of the present invention, the mobile terminal further includes one or more programs. The one or more programs are stored in the memory and executed by one or more processors. The one or more programs include an instruction, and the instruction is used to:

detect a gesture on the touchscreen;

when a pressure value of the gesture exceeds a first threshold P1, start to record change information of the pressure value of the gesture;

when the pressure value is lower than a second threshold P2, stop recording the change information of the pressure value;

parse the recorded change information of the pressure value;

when the parsing of the change information indicates that the gesture includes at least two consecutive effective screen presses, determine that the gesture matches a first instruction; and in response to the first instruction, present a first graphical user interface on the touchscreen.

Still further, that the instruction is used to parse the recorded change information of the pressure value includes the following: If the change information of the pressure value indicates that a first event occurs, the gesture is considered to include one effective screen press. The first event is as follows: The pressure value of the gesture is reduced from being greater than a third threshold P3 to being less than a fourth threshold P4 once, where $P3>P4 \geq P1 \geq P2$.

Still further, that the instruction is used to parse the recorded change information of the pressure value includes the following: If the change information of the pressure value indicates that a second event occurs, the gesture is considered to include one effective screen press, and this effective screen press is a hard press. The second event is as follows: The pressure value of the gesture is reduced from being greater than a fifth threshold P5 to being less than the fourth threshold P4 once, where $P5>P3>P4 \geq P1 \geq P2$.

Still further, that the instruction is used to parse the recorded change information of the pressure value includes the following: If the change information of the pressure value indicates that a third event occurs, the gesture is considered to include one effective screen press, and this effective screen press is a light press. The third event is as follows: The pressure value of the gesture is reduced from being greater than a sixth threshold P6 to being less than the fourth threshold P4 once, and the pressure value of the gesture is less than a fifth threshold P5, where $P5>P6 \geq P3>P4 \geq P1 \geq P2$.

In this embodiment of the present invention, when detecting that a gesture includes at least two consecutive effective screen presses, and a pressure value is greater than the first threshold P1 and less than the second threshold P2, the mobile terminal determines that the gesture matches the first instruction. According to magnitude of the pressure on the touchscreen pressed by the user, the mobile terminal responds to a corresponding user gesture. With this method, precision of identifying a press gesture by the touchscreen using press sensing is improved, a problem that it is difficult for the touchscreen to distinguish a long press gesture from the press gesture is resolved, and user experience is improved.

In another embodiment of the present invention, the mobile terminal further includes one or more programs. The one or more programs are stored in the memory and executed by the one or more processors. The one or more programs include an instruction, and the instruction is used to:

detect whether there is a gesture on a touchscreen.

when it is detected that there is a gesture acting on the touchscreen, start to record change information of a pressure value of the gesture;

when it is detected that the gesture no longer acts on the touchscreen, stopping recording the change information of the pressure value;

parse the recorded change information of the pressure value;

when the parsing of the change information indicates that the gesture includes at least two consecutive effective screen presses, determine that the gesture matches a first instruction, and in response to the first instruction, present a first graphical user interface on the touchscreen.

Still further, that the instruction is used to parse the recorded change information of the pressure value includes the following: If the change information of the pressure value indicates that the following pressure event occurs, the gesture is considered to include one effective screen press. The pressure event is as follows: The pressure value of the touch gesture is reduced from being greater than a third threshold P3 to being less than a fourth threshold P4 once, where P3>P4.

Still further, that the instruction is used to parse the recorded change information of the pressure value includes the following: If the change information of the pressure value indicates that the following hard press event occurs, the touch gesture is considered to include one effective screen press, and this effective screen press is a hard press. The hard press event is as follows: The pressure value of the gesture is reduced from being greater than a fifth threshold P5 to being less than the fourth threshold P4 once, where P5>P3>P4.

Still further, that the instruction is used to parse the recorded change information of the pressure value includes the following: If the change information of the pressure value indicates that the following light press event occurs, the gesture is considered to include one effective screen press, and this effective screen press is a light press. The light press event is as follows: The pressure value of the gesture is reduced from being greater than a sixth threshold P6 to being less than the fourth threshold P4 once, and the pressure value of the gesture is less than a fifth threshold P5, where P5>P6≥P3>P4.

In this embodiment of the present invention, with the foregoing method, when there is a gesture that includes at least two consecutive effective screen presses, the gesture is responded. Precision of identifying a press gesture by the touchscreen using press sensing is improved, a problem that it is difficult for the touchscreen to distinguish a long press gesture from the press gesture is resolved, and user experience is improved. Still further, the mobile terminal can define multiple types of gesture instructions by defining multiple types of press gestures such as a light press and a hard press. The multiple types of press gestures may further be combined with another type of gesture. Combinations of the multiple types of press gestures and multiple gestures can enrich a means by which the user interacts with the mobile terminal, for example, the means is used to set a screen password unlocking gesture of the touchscreen. This can increase diversity of gestures entered on the mobile terminal.

A person of ordinary skill in the art may be aware that, in combination with the examples described in the embodiments disclosed in this specification, units, algorithms and method steps may be implemented by a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, the foregoing mobile terminal and access terminal separately perform a working process in the described method embodiments of the present invention; and for specific working, reference may be made to a corresponding process in the foregoing method embodiments, and details are not described herein again.

In the several embodiments provided in this application, the disclosed server and method may be implemented in other manners. For example, the described server embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit.

A person of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for responding to a gesture acting on a touchscreen, wherein the method comprises:

detecting a gesture acting on a touchscreen;

when a pressure value of the gesture exceeds a first threshold P1, starting to record change information of the pressure value of the gesture;

when the pressure value is lower than a second threshold P2, stopping recording the change information of the pressure value;

parsing the recorded change information of the pressure value;
based at least on the parsing of the change information indicating that the gesture comprises two consecutive effective screen presses, determining that the gesture matches a first instruction, wherein the change information indicating that the gesture comprises two consecutive effective screen presses comprises a continuous pressure value greater than the second threshold P2 that increases to exceed a third threshold P3, reduces to below a fourth threshold P4, increases to exceed the third threshold P3, and reduces to below the fourth threshold P4, and wherein P3>P4>P2; and
in response to the first instruction, presenting a first graphical user interface on the touchscreen.

2. The method according to claim 1, wherein the parsing comprises:
in response to determining that the change information of the pressure value indicates that a first event occurs, determining that the gesture comprises one effective screen press of the touchscreen, wherein the first event occurs when, after starting to record, the pressure value of the gesture is reduced from being greater than the third threshold P3 to being less than the fourth threshold P4 once, wherein P3>P4≥P1≥P2.

3. The method according to claim 2, wherein the parsing further comprises:
in response to determining that the change information of the pressure value indicates that a second event occurs, determine that the gesture comprises one effective hard screen press of the touchscreen in which the touchscreen is pressed harder than the one effective screen press, wherein the second event occurs when, after starting to record, the pressure value of the gesture is reduced from being greater than a fifth threshold P5 to being less than the fourth threshold P4 only once, wherein P5>P3>P4≥P1≥P2.

4. The method according to claim 2, wherein the parsing further comprises:
in response to determining that the change information of the pressure value indicates that a third event occurs, determine that the gesture comprises one effective light screen press of the touchscreen in which the touchscreen is pressed lighter than the one effective screen press, wherein the third event occurs when, after starting to record, the pressure value of the gesture is reduced from being greater than a sixth threshold P6 to being less than the fourth threshold P4 only once, and the pressure value of the gesture is less than a fifth threshold P5, wherein P5>P6≥P3>P4≥P1≥P2.

5. The method according to claim 1, wherein the second threshold P2 is zero.

6. The method according to claim 1, wherein the two consecutive effective screen presses are separated by a time interval that is greater than a first time interval T1 and less than a second time interval T2.

7. A method for responding to a gesture comprising:
detecting whether there is a gesture acting on a touchscreen;
when it is detected that there is a gesture acting on the touchscreen, starting to record change information of a pressure value of the gesture;
when it is detected that the gesture no longer acts on the touchscreen, stopping recording the change information of the pressure value;
parsing the recorded change information of the pressure value;
based at least on the parsing of the change information indicating that the gesture comprises two consecutive effective screen presses, determining that the gesture matches a first instruction, wherein the change information indicating that the gesture comprises two consecutive effective screen presses comprises a continuous pressure value greater than a second threshold P2 that increases to exceed a third threshold P3, reduces to below a fourth threshold P4, increases to exceed the third threshold P3, and reduces to below the fourth threshold P4, and wherein P3>P4>P2; and
in response to the first instruction, presenting a first graphical user interface on the touchscreen.

8. The method according to claim 7, wherein the parsing comprises:
in response to determining that the change information of the pressure value indicates that a pressure event occurs, determine that the gesture comprises one effective screen press of the touchscreen, wherein the one effective screen press occurs when, after starting to record, the pressure value of the gesture is reduced from being greater than the third threshold P3 to being less than the fourth threshold P4 once, wherein P3>P4.

9. The method according to claim 8, wherein the parsing further comprises:
in response to determining that the change information of the pressure value indicates that a hard press event occurs, determine that the gesture comprises one effective hard screen press of the touchscreen in which the touchscreen is pressed harder than the one effective screen press, wherein the hard press event occurs when, after starting to record, the pressure value of the gesture is reduced from being greater than a fifth threshold P5 to being less than the fourth threshold P4 once, wherein P5>P3>P4.

10. The method according to claim 8, wherein the parsing further comprises:
in response to determining that the change information of the pressure value indicates that a light press event occurs, determine that the gesture comprises one effective light screen press of the touchscreen in which the touchscreen is pressed lighter than the one effective screen press, wherein the light press event occurs when, after starting to record, the pressure value of the gesture is reduced from being greater than a sixth threshold P6 to being less than the fourth threshold P4 once, and the pressure value of the gesture is less than a fifth threshold P5, wherein P5>P6≥P3>P4.

11. The method according to claim 7, wherein the two consecutive effective screen presses are separated by a time interval that is greater than a first time interval T1 and less than a second time interval T2.

12. A terminal comprising:
a touchscreen;
a processor; and
a memory storing a program to be executed in the processor, the program comprising instructions that when executed cause the processor to:
detect a gesture acting on a touchscreen;
when a pressure value of the gesture exceeds a first threshold P1, start to record change information of the pressure value of the gesture;
when the pressure value is lower than a second threshold P2, stop recording the change information of the pressure value;
parse the recorded change information of the pressure value;

based at least on the parsing of the change information indicating that the gesture comprises two consecutive effective screen presses, determine that the gesture matches a first instruction, wherein the change information indicating that the gesture comprises two consecutive effective screen presses comprises a continuous pressure value greater than the second threshold P2 that increases to exceed a third threshold P3, reduces to below a fourth threshold P4, increases to exceed the third threshold P3, and reduces to below the fourth threshold P4, and wherein $P3>P4>P2$; and in response to the first instruction, present a first graphical user interface on the touchscreen.

13. The terminal according to claim 12, wherein instructions to parse when executed further cause the processor to:

in response to determining that the change information of the pressure value indicates that a first event occurs, determine that the gesture comprises one effective screen press of the touchscreen, wherein the first event occurs when, after starting to record, the pressure value of the gesture is reduced from being greater than the third threshold P3 to being less than the fourth threshold P4 once, wherein $P3>P4 \geq P1 \geq P2$.

14. The terminal according to claim 13, wherein instructions to parse when executed further cause the processor to:

in response to determining that the change information of the pressure value indicates that a second event occurs, determine that the gesture comprises one effective hard screen press of the touchscreen in which the touchscreen is pressed harder than the one effective screen press, wherein the second event occurs when, after starting to record, the pressure value of the gesture is reduced from being greater than a fifth threshold P5 to being less than the fourth threshold P4 only once, wherein $P5>P3>P4 \geq P1 \geq P2$.

15. The terminal according to claim 13, wherein instructions to parse when executed further cause the processor to:

in response to determining that the change information of the pressure value indicates that a third event occurs, determine that the gesture comprises one effective light screen press of the touchscreen in which the touchscreen is pressed lighter than the one effective screen press, wherein the third event occurs when, after starting to record, the pressure value of the gesture is reduced from being greater than a sixth threshold P6 to being less than the fourth threshold P4 only once, and the pressure value of the gesture is less than a fifth threshold P5, wherein $P5>P6 \geq P3>P4 \geq P1 \geq P2$.

16. The terminal according to claim 12, wherein the second threshold P2 is zero.

17. The terminal according to claim 12, wherein the two consecutive effective screen presses are separated by a time interval that is greater than a first time interval T1 and less than a second time interval T2.

18. A terminal comprising:
a touchscreen;
a processor; and
a memory storing a program to be executed in the processor, the program comprising instructions that when executed cause the processor to:
detect whether there is a gesture acting on a touchscreen;
when it is detected that there is a gesture acting on the touchscreen, start to record change information of a pressure value of the gesture;
when it is detected that the gesture no longer acts on the touchscreen, stop recording the change information of the pressure value;
parse the recorded change information of the pressure value;
based at least on the parsing of the change information indicating that the gesture comprises two consecutive effective screen presses, determine that the gesture matches a first instruction, wherein the change information indicating that the gesture comprises two consecutive effective screen presses comprises a continuous pressure value greater than a second threshold P2 that increases to exceed a third threshold P3, reduces to below a fourth threshold P4, increases to exceed the third threshold P3, and reduces to below the fourth threshold P4, and wherein $P3>P4>P2$; and
in response to the first instruction, present a first graphical user interface on the touchscreen.

19. The terminal according to claim 18, wherein instructions to parse when executed further cause the processor to:

in response to determining that the change information of the pressure value indicates that pressure event occurs, determine that the gesture comprises one effective screen press of the touchscreen, wherein the one effective screen press occurs when, after starting to record, the pressure value of the gesture is reduced from being greater than the third threshold P3 to being less than the fourth threshold P4 once, wherein $P3>P4$.

20. The terminal according to claim 19, wherein instructions to parse when executed further cause the processor to:

in response to determining that the change information of the pressure value indicates that a hard press event occurs, determine that the gesture comprises one effective hard screen press of the touchscreen in which the touchscreen is pressed harder than the one effective screen press, wherein the hard press event occurs when, after starting to record, the pressure value of the gesture is reduced from being greater than a fifth threshold P5 to being less than the fourth threshold P4 once, wherein $P5>P3>P4$.

21. The terminal according to claim 19, wherein instructions to parse when executed further cause the processor to:

in response to determining that the change information of the pressure value indicates a light press event occurs, determine that the gesture comprises one effective light screen press of the touchscreen in which the touchscreen is pressed lighter than the one effective screen press, wherein the light press event occurs when, after starting to record, the pressure value of the gesture is reduced from being greater than a sixth threshold P6 to being less than the fourth threshold P4 once, and the pressure value of the gesture is less than a fifth threshold P5, wherein $P5>P6 \geq P3>P4$.

22. The terminal according to claim 18, wherein the two consecutive effective screen presses are separated by a time interval that is greater than a first time interval T1 and less than a second time interval T2.

\* \* \* \* \*